(12) United States Patent
Alter et al.

(10) Patent No.: US 8,112,934 B2
(45) Date of Patent: Feb. 14, 2012

(54) BEAR TRAP

(75) Inventors: Ryan Carl Alter, Missoula, MT (US); James S. Green, Missoula, MT (US)

(73) Assignee: Alter Enterprise LLC, Missoula, MT (US)

( * ) Notice: Subject to any disclaimer, the term of this patent is extended or adjusted under 35 U.S.C. 154(b) by 287 days.

(21) Appl. No.: 12/624,679

(22) Filed: Nov. 24, 2009

(65) Prior Publication Data

US 2011/0119987 A1    May 26, 2011

(51) Int. Cl.
*A01M 23/20* (2006.01)
*A01M 23/16* (2006.01)
*A01M 23/00* (2006.01)

(52) U.S. Cl. ..................................... 43/61; 43/58; 43/60
(58) Field of Classification Search ................ 43/58, 60, 43/61
See application file for complete search history.

(56) References Cited

U.S. PATENT DOCUMENTS

| | | | | |
|---|---|---|---|---|
| 305,664 A * | 9/1884 | Bryan | | 43/61 |
| 971,530 A * | 10/1910 | Draper | | 43/61 |
| 986,010 A * | 3/1911 | Kennedy | | 43/61 |
| 1,139,849 A * | 5/1915 | Collins | | 43/61 |
| 1,214,358 A * | 1/1917 | Nunn | | 43/61 |
| 1,243,088 A * | 10/1917 | Mazurek | | 43/61 |
| 1,255,798 A * | 2/1918 | Schuckman | | 43/61 |
| 1,294,364 A * | 2/1919 | Bales | | 43/61 |
| 1,345,716 A * | 7/1920 | Sudul | | 43/61 |
| 1,372,663 A * | 3/1921 | Albers et al. | | 43/61 |
| 1,382,416 A * | 6/1921 | Dresser | | 43/61 |
| 1,453,795 A * | 5/1923 | Hovell | | 43/61 |
| 1,474,096 A * | 11/1923 | Sorensen | | 43/61 |
| 1,516,388 A * | 11/1924 | Kruszynski | | 43/61 |
| 1,524,692 A * | 2/1925 | Dick | | 43/61 |
| 1,779,300 A * | 10/1930 | Weatherly | | 43/60 |
| 1,990,861 A * | 2/1935 | Exum | | 43/61 |
| 2,163,961 A * | 6/1939 | Pendry | | 43/61 |
| 2,478,605 A * | 8/1949 | Symens | | 43/61 |
| 2,488,202 A * | 11/1949 | Kern | | 43/61 |
| 2,544,026 A * | 3/1951 | Kern et al. | | 43/61 |
| 2,725,661 A * | 12/1955 | Bowman | | 43/61 |
| 3,426,470 A * | 2/1969 | Rudolph | | 43/61 |
| 4,187,634 A * | 2/1980 | Kintz | | 43/61 |
| 4,884,064 A * | 11/1989 | Meehan | | 43/58 |
| 4,899,484 A * | 2/1990 | Morin | | 43/61 |

(Continued)

FOREIGN PATENT DOCUMENTS

DE    102007037275 A1 *    2/2009

(Continued)

*Primary Examiner* — Darren W Ark
(74) *Attorney, Agent, or Firm* — Antoinette M. Tease

(57) ABSTRACT

A bear trap comprising a trap door, a housing that is large enough to enclose a bear and bait, a bait arm, a first computer, a first temperature sensor located inside the housing, and a camera. When a bear enters the trap and pulls on the bait on the bait arm, the trap door descends. The first computer allows a user to lift the trap door remotely from anywhere in the world via a second computer or device with Internet access. The first computer and first temperature sensor allow a user to monitor temperature inside the housing from anywhere in the world via a second computer or device with Internet access. The first computer and camera allow a user to view a bear inside the housing from anywhere in the world via a second computer or device with Internet access. The first computer preferably connects to the Internet via satellite.

19 Claims, 18 Drawing Sheets

U.S. PATENT DOCUMENTS

| | | | | |
|---|---|---|---|---|
| 5,235,778 A * | 8/1993 | Sutherlin | | 43/61 |
| 5,345,710 A * | 9/1994 | Bitz | | 43/61 |
| 5,477,635 A * | 12/1995 | Orsano | | 43/81 |
| 5,615,514 A * | 4/1997 | Meade, Jr. | | 43/61 |
| 6,003,265 A * | 12/1999 | Lundgren | | 43/61 |
| 6,202,340 B1 * | 3/2001 | Nieves | | 43/61 |
| 6,445,301 B1 * | 9/2002 | Farrell et al. | | 43/61 |
| 6,618,982 B2 * | 9/2003 | Lafforthun | | 43/61 |
| 6,775,946 B2 * | 8/2004 | Wright | | 43/61 |
| 6,990,767 B1 * | 1/2006 | Margalit | | 43/61 |
| 7,076,913 B1 * | 7/2006 | Dow et al. | | 43/80 |
| 7,317,399 B2 * | 1/2008 | Chyun | | 43/58 |
| 7,509,770 B2 * | 3/2009 | Gardner et al. | | 43/58 |
| 7,530,195 B2 * | 5/2009 | Muller et al. | | 43/58 |
| 7,540,109 B2 * | 6/2009 | Hall | | 43/61 |
| 7,854,088 B2 * | 12/2010 | Kurachi | | 43/61 |
| 8,061,076 B2 * | 11/2011 | Kelley | | 43/61 |
| 2003/0213161 A1 | 11/2003 | Gardner, Jr. et al. | | |
| 2005/0097808 A1 * | 5/2005 | Vorhies et al. | | 43/61 |
| 2005/0151653 A1 * | 7/2005 | Chan et al. | | 43/58 |
| 2006/0150470 A1 * | 7/2006 | Ronnau | | 43/58 |
| 2006/0265941 A1 * | 11/2006 | Newton | | 43/60 |
| 2008/0092431 A1 * | 4/2008 | Fritzboger | | 43/79 |
| 2008/0236023 A1 * | 10/2008 | Thomas et al. | | 43/58 |
| 2009/0192763 A1 * | 7/2009 | Gardner et al. | | 43/58 |
| 2009/0193707 A1 * | 8/2009 | Moran et al. | | 43/58 |
| 2010/0134301 A1 * | 6/2010 | Borth et al. | | 43/58 |
| 2010/0242338 A1 * | 9/2010 | Facklam | | 43/61 |
| 2011/0138676 A1 * | 6/2011 | Moustirats | | 43/61 |
| 2011/0167709 A1 * | 7/2011 | Pinkston | | 43/61 |

FOREIGN PATENT DOCUMENTS

| | | | |
|---|---|---|---|
| FR | 2832293 A1 * | 5/2003 |
| JP | 08056549 A * | 3/1996 |
| JP | 2002272351 A * | 9/2002 |
| JP | 2004057147 A * | 2/2004 |
| JP | 2004097019 A * | 4/2004 |
| JP | 2004102648 A * | 4/2004 |
| JP | 2004305050 A * | 11/2004 |
| JP | 2005095028 A * | 4/2005 |
| JP | 2006136302 A * | 6/2006 |
| JP | 2008253235 A * | 10/2008 |
| JP | 2011083198 A * | 4/2011 |

* cited by examiner

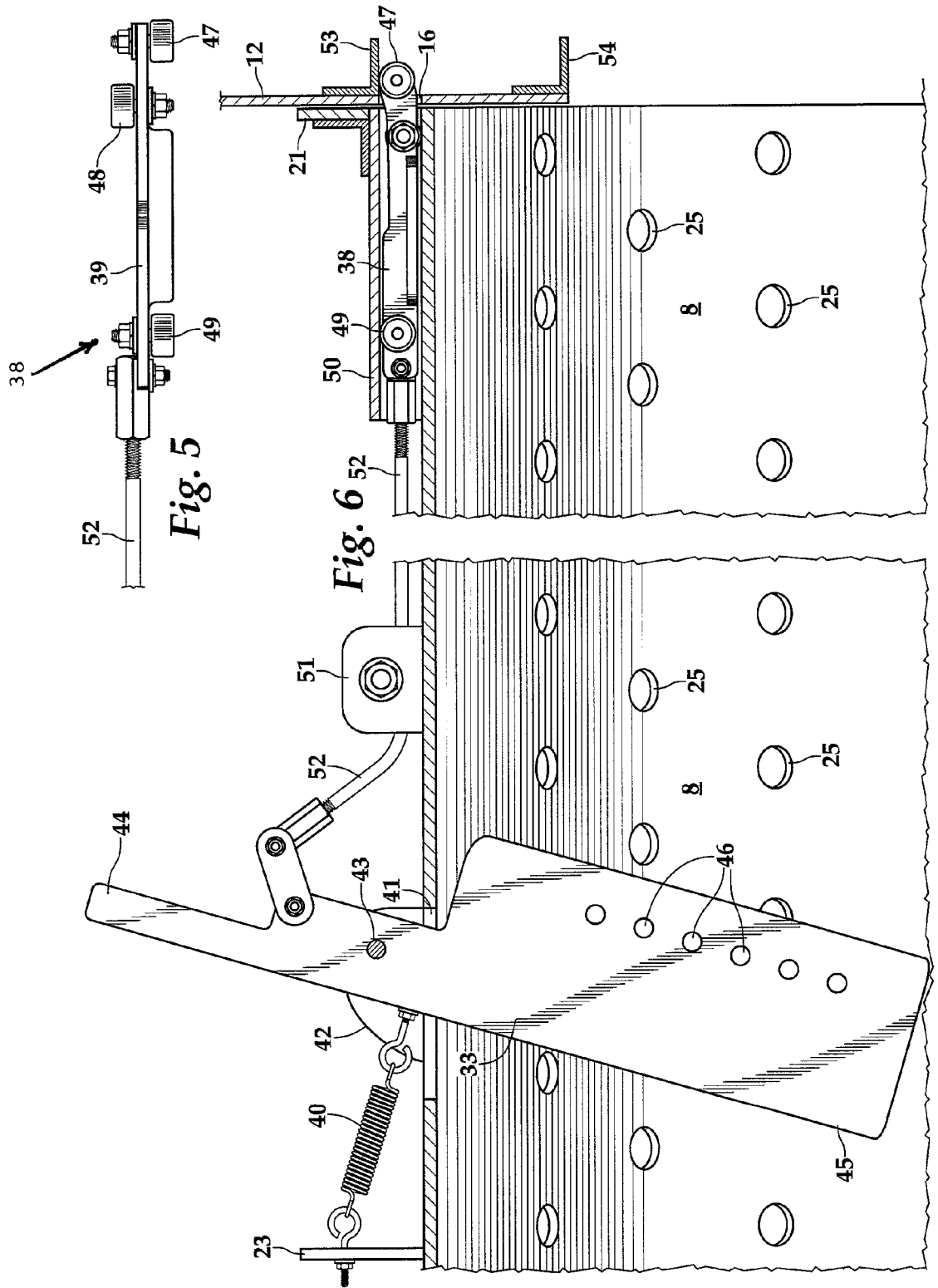

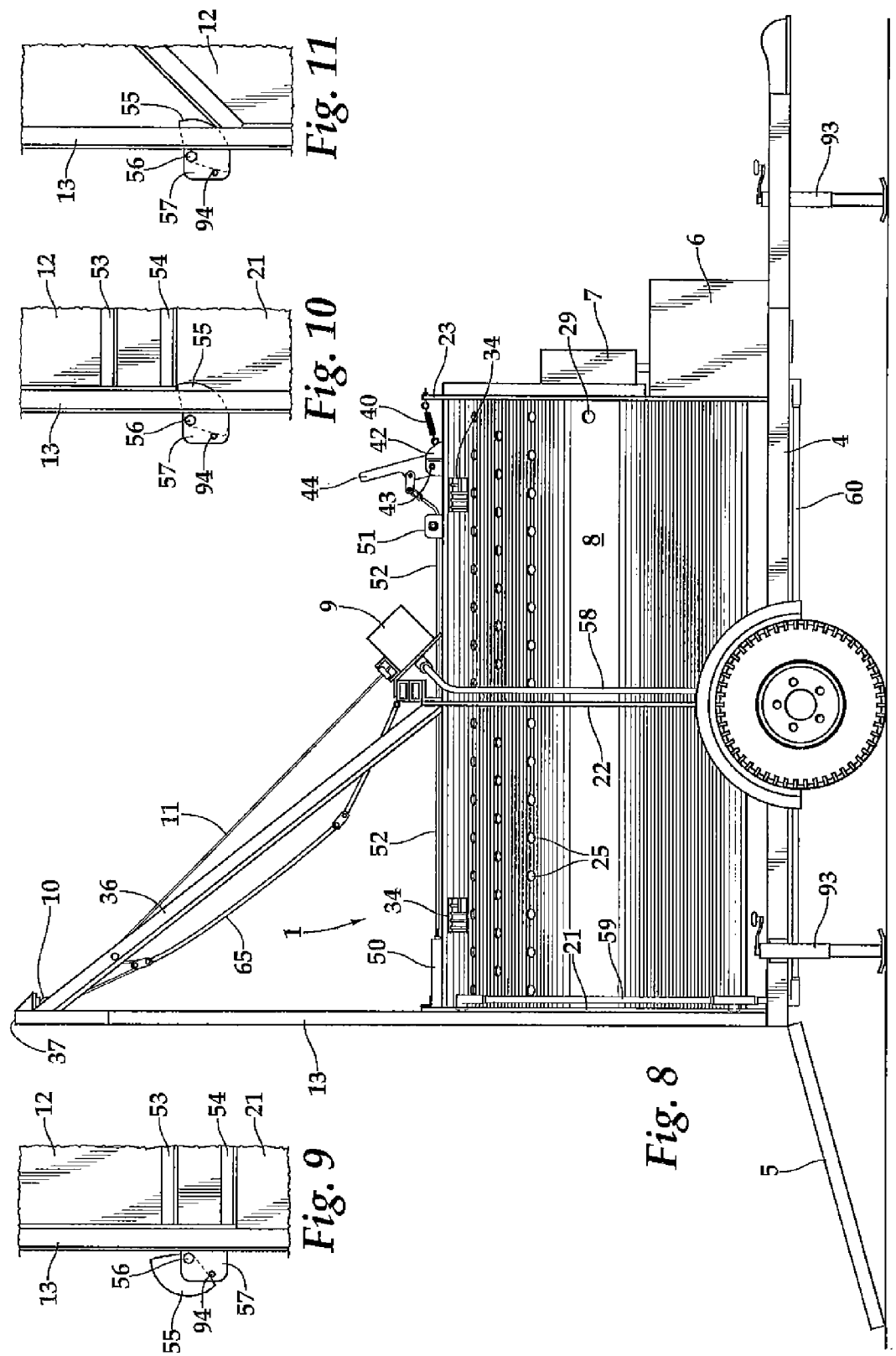

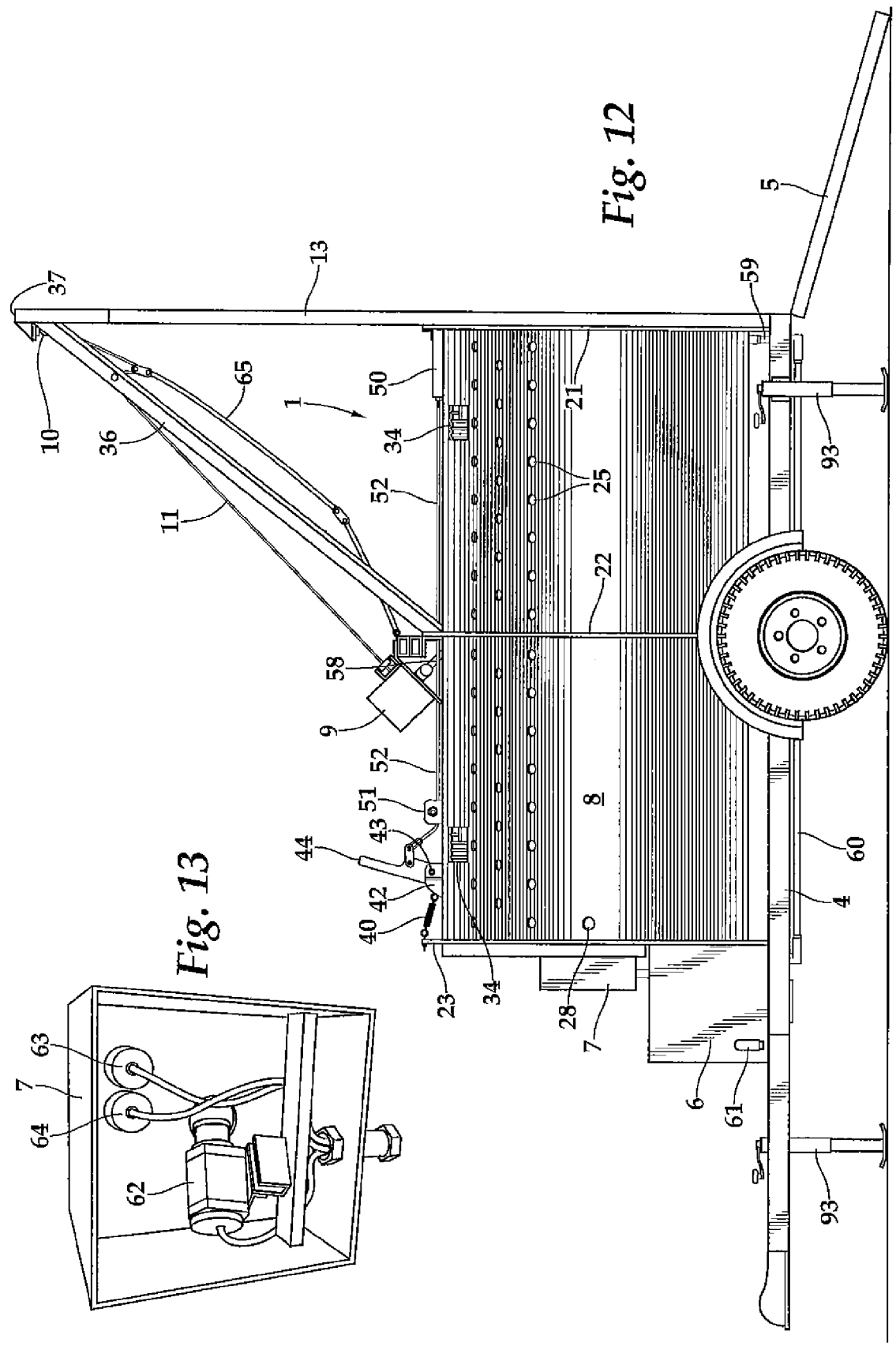

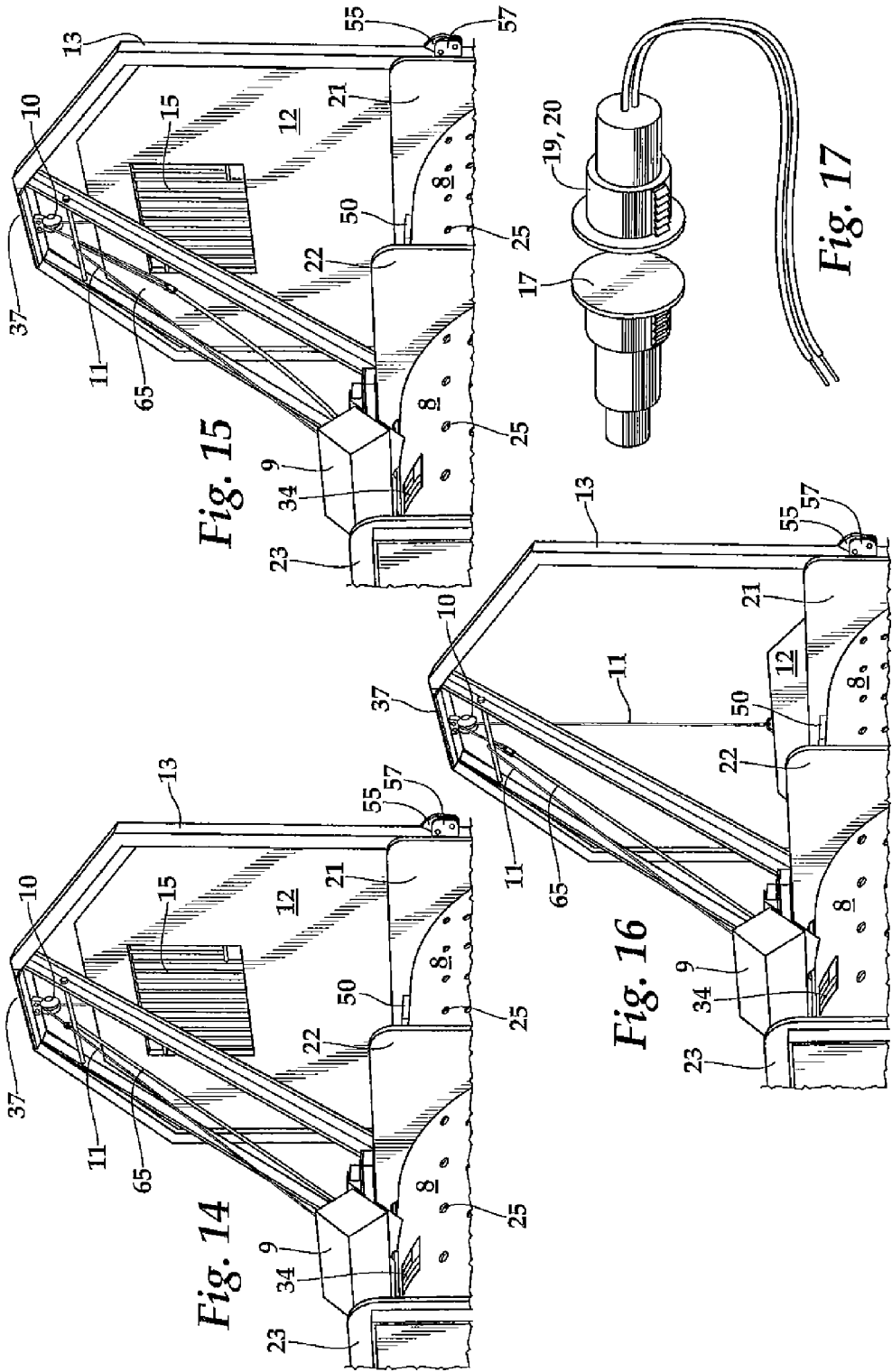

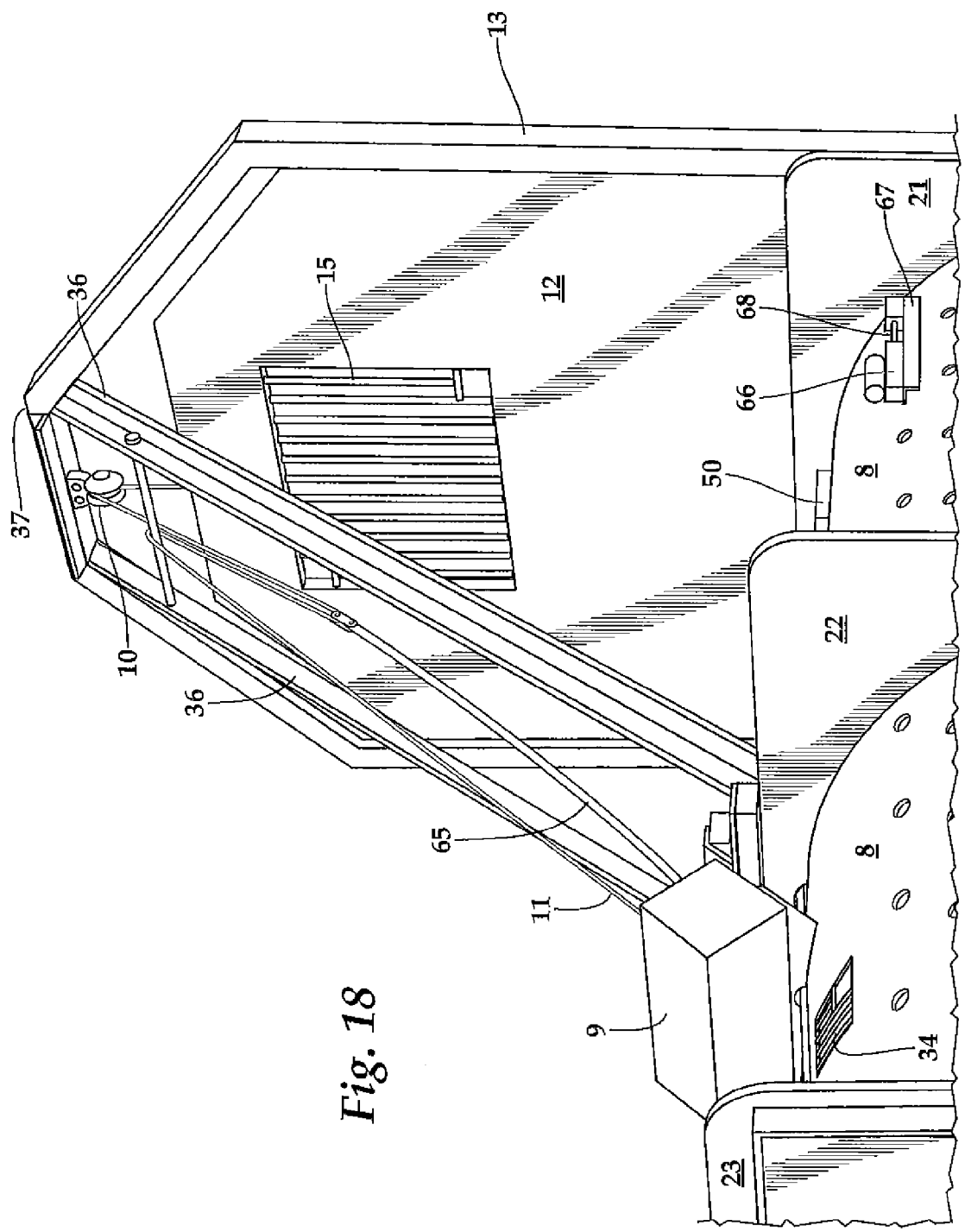

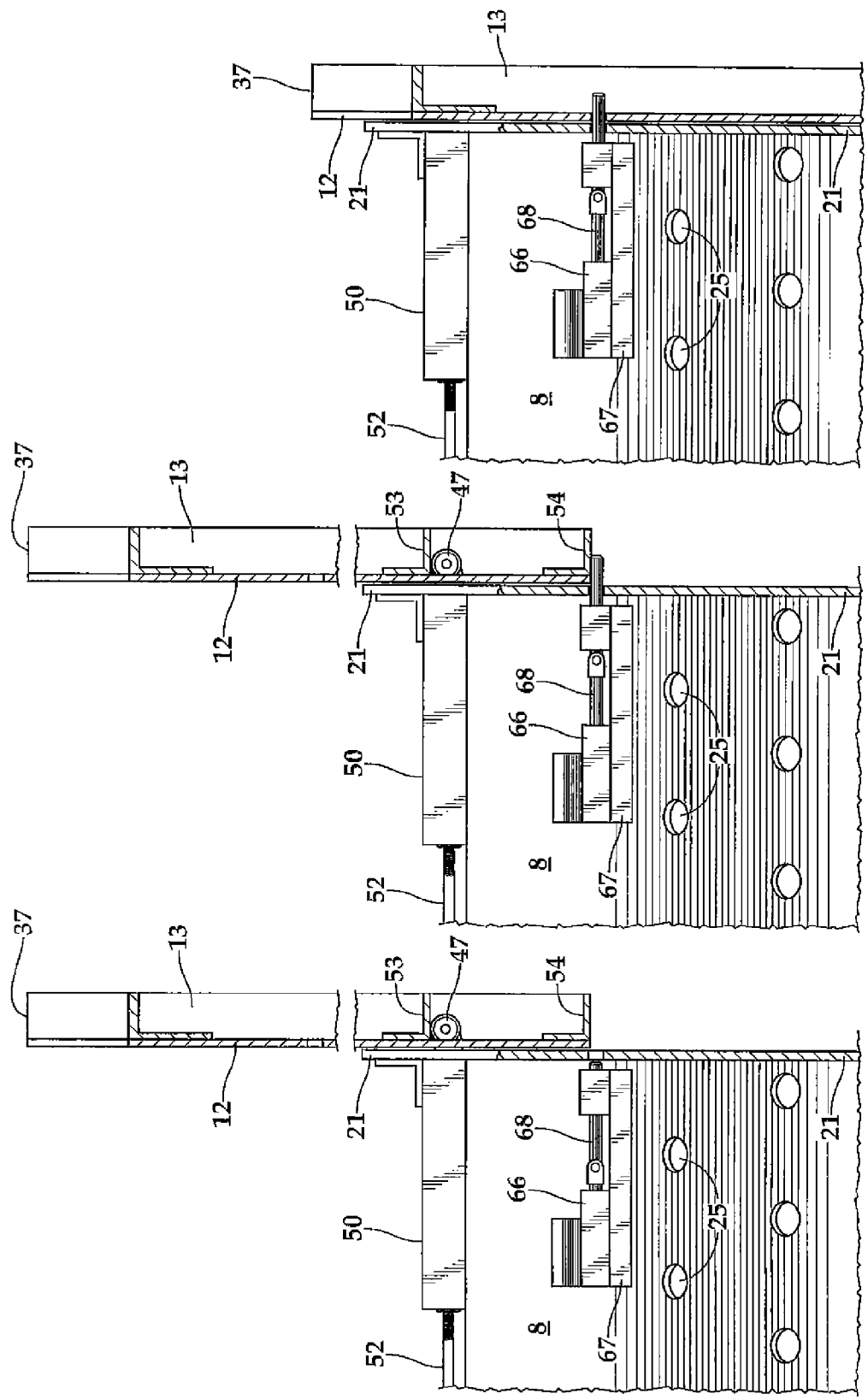

BEAR TRAP

BACKGROUND OF THE INVENTION

1. Field of the Invention

The present invention relates generally to the field of bear traps, and more specifically, to a bear trap that is controlled both manually and remotely.

2. Description of the Related Art

A major problem with conventional bear traps is that the operator must be physically present at the site to operate (i.e., open or close) the trap. Manually lifting the door of a bear trap—whether by hand or by connecting the winch cable to a vehicle—can be extremely hazardous due to the presence of the bear in the vicinity of the operator. Furthermore, conventional bear traps require the operator to travel to the field, which can take hours or even days, in order to release the bear. Sometimes crews must stay with the trap for days until a bear is caught because there is no way to monitor the trap remotely. In situations where it is not possible to leave a crew with the trap, the only other alternative is for trap operators to periodically visit the trap site, which can be prohibitively expensive in terms of fuel resources if multiple and remote sites are involved. Providing for remote operation of the bear trap would eliminate the safety risk to the operator, and it would also allow the operator to react more quickly if a bear is caught in the trap and immediate release is desired (for example, to reduce bear stress and/or mortality rates). Satellite technology allows the remote computer to be located anywhere in the world.

There exist a number of inventions directed toward bear traps, but none that possesses the technological advantages and structural features of the present invention. For example, U.S. Patent Application Pub. No. 20050097808 (Vorhies et al.) describes a remotely activated animal trap with an electrically-actuated door-drop and a communications module that can be either mounted on or separate from the trap. The door-drop is activated when the bait can, which has a magnet secured to its bottom, is moved by an animal such that the magnet is no longer situated directly on top of the magnetic proximity switch on the floor of the trap. The magnetic force opens the switch, and when that force is broken (for example, when an animal pushes the bait can away from the switch), the switch closes and a battery causes the catch solenoid to retract, thereby setting of a series of mechanical reactions that result in the trap door closing.

At the same time, a signal is sent to home base indicating that an animal is in the trap. The trap communicates with the home base via radio frequency (RF); therefore, the home base must be within RF range of the trap. The home base receiver forwards the data signal to a computer either directly or via packet modem. A major drawback of this invention is that the home base computer must be within RF range of the trap. In addition, this invention does not incorporate the ability to watch the trapped animal via a camera or to monitor the temperature inside the trap, nor does it incorporate the door arming mechanism of the present invention, which is specifically suited to deal with larger animals and heavier doors.

U.S. Pat. No. 7,509,770 (Gardner, Jr. et al., 2009) deals with a pest monitoring system for collecting, communicating and analyzing information from a plurality of pest monitoring locations. This invention does not deal with large animals, nor does it necessarily involve a trap. According to the specification, the pest monitoring location may be—but need not be—a trap, and the types of pests at issue are insects and rodents. The application goes into no detail at all concerning the construction of the trap, and the only activity being monitored is the presence of a pest. The invention does not provide the ability to watch—via live camera—an animal within a trap or to monitor the temperature within the trap, nor does it disclose a trap that is physically constructed for the purpose of containing a large animal.

U.S. Pat. Nos. 986,010 (Kennedy, 1911), 1,255,798 (Schuckman, 1918) and 2,478,605 (Symens, 1949) all disclose animal traps without any remote actuation or monitoring.

U.S. Pat. No. 6,775,946 (Wright, 2004) discusses the use of radio frequency transmitters and receivers to identify and display the current state of a plurality of animal traps. This invention does not involve the use of satellite technology, nor does it disclose any structure for a large animal trap.

None of the above inventions provides for remote operation of a bear trap, via satellite, with cameras for viewing the bear inside the trap, sensors for monitoring the temperature inside the trap, and a structure that is designed to capture and contain a large and powerful animal. Accordingly, it is an object of the present invention to provide a bear trap that may be operated remotely in addition to manually. It is a further object of the present invention to provide the ability to monitor by camera a bear caught in a bear trap and to monitor the temperature inside the trap to determine when it may pose a health risk to the bear. These and other advantages of the present invention are discussed more fully below.

BRIEF SUMMARY OF THE INVENTION

The present invention is a bear trap comprising a trap door, a housing that is large enough to enclose a bear and bear bait, a bait arm, a first computer, a first temperature sensor located inside the housing, and a camera; wherein the bait is attached to the bait arm; wherein when a bear enters the trap and pulls on the bait on the bait arm, the trap door descends; wherein the first computer allows a user to lift the trap door remotely from anywhere in the world via a second computer with Internet access; wherein the first computer and the first temperature sensor allow a user to monitor temperature inside the housing from anywhere in the world via a second computer with Internet access; and wherein the first computer and the camera allow a user to view a bear inside the housing from anywhere in the world via a second computer with Internet access. In a preferred embodiment, a cable connects the trap door to a winch, and the first computer allows a user to arm the trap door by lifting the trap door and letting out the cable remotely from anywhere in the world via a second computer with Internet access.

In a preferred embodiment, the first computer connects to the Internet via satellite. Preferably, the bear trap is powered by solar panels. In a preferred embodiment, the invention further comprises a first magnetic sensor, a second magnetic sensor and a magnet, a first plate is situated directly behind the trap door when the trap door is in a closed position, the first plate has a top end and a bottom end, the first magnetic sensor is located on the bottom end of the first plate, the second magnetic sensor is located on the top end of the first plate, the trap door has a bottom end, and the magnet is located on the bottom end of the trap door.

In a preferred embodiment, the first computer is located inside of an electronics box, the invention further comprises a second temperature sensor that is located inside the electronics box, and the first computer and the second temperature sensor allow a user to monitor temperature inside the electronics box remotely from anywhere in the world via a second computer with Internet access. In yet another preferred embodiment, the invention further comprises a third temperature sensor that measures ambient temperature in the vicinity of the bear trap, and the first computer and the third temperature sensor allow a user to monitor ambient temperature in the vicinity of the bear trap remotely from anywhere in the world via a second computer with Internet access.

In a preferred embodiment, the invention further comprises a visible spectrum light and an infrared light, and the first computer allows a user to turn the visible spectrum light and the infrared light on and off remotely from anywhere in the world via a second computer with Internet access. In yet another preferred embodiment, the invention further comprises a visible spectrum light and an infrared light, and the lights are turned on and off automatically based on pre-programmed settings.

The invention preferably further comprises at least one food trough and at least one water trough inside the housing. In a preferred embodiment, the bait arm has a bottom end, and the invention further comprises a shuttle piece that is connected to the bait arm and that causes the trap door to be maintained in an open position until and unless a bear pulls the bottom end of the bait arm rearward toward the trap door.

In one embodiment, the trap door slides up and down on two vertical tracks, and the invention further comprises a bat wing that is attached to one of the vertical tracks and that maintains the trap door in an open or closed position. In an alternate embodiment, the invention further comprises an actuator that maintains the trap door in an open or closed position when the retractor is extended.

In a preferred embodiment, a cable connects the trap door to a winch, and the invention further comprises a winch control switch that allows the winch to be operated either locally or remotely via the Internet. In one embodiment, if the winch is operated locally, it is operated via a tethered winch control switch. In an alternate embodiment, if the winch is operated locally, it is operated via a wireless remote winch control. The housing preferably comprises ventilation holes.

In a preferred embodiment, the present invention is a bear trap comprising a trap door, a housing that is large enough to enclose a bear and bear bait, a bait arm, a computer, a temperature sensor located inside the housing, and a camera; wherein the bait is attached to the bait arm; wherein when a bear enters the trap and pulls on the bait on the bait arm, the trap door descends; wherein the computer allows a user to lift the trap door remotely from anywhere in the world via a device with Internet access; wherein the computer and the temperature sensor allow a user to monitor the temperature inside the housing from anywhere in the world via a device with Internet access; and wherein the computer and the camera allow a user to view a bear inside the housing from anywhere in the world via a device with Internet access. In a preferred embodiment, the computer allows a user to arm the trap door by lifting the trap door and letting out a cable that connects the trap door to a winch remotely from anywhere in the world via a device with Internet access.

BRIEF DESCRIPTION OF THE DRAWINGS

FIG. 5 is a top view of the shuttle piece that holds the trap door in an open position.
FIG. 6 is a section view of the bait arm and shuttle piece assembly with the bait arm in a forward position and the trap door in an open position.
FIG. 8 is a left side view of the bear trap with the door in an open and armed position.
FIG. 9 is a detail view of the bat wing fixed in a retracted position.
FIG. 10 is a detail view of the bat wing maintaining the trap door in an open position.
FIG. 11 is a detail view of the bat wing maintaining the trap door in a closed position.
FIG. 12 is a right side view of the bear trap with the trap door in an open and armed position.
FIG. 13 is a perspective view of the components inside the camera/light box.
FIG. 14 is a detail view of the winch and pulley assembly with the trap door in an up and unarmed position.
FIG. 15 is a detail view of the winch and pulley assembly with the trap door in an up and armed position.
FIG. 16 is a detail view of the winch and pulley assembly with the trap door in a down position.
FIG. 17 is a perspective view of the magnet and magnetic sensor assembly.
FIG. 18 is a perspective view of the rear top area of the bear trap with an optional actuator.
FIG. 19 is a detail view of the actuator in a retracted position and the trap door in an "up" position.
FIG. 20 is a detail view of the actuator in an extended position and the trap door in an "up" position.
FIG. 20A is a detail view of the actuator in an extended position and the trap door in a "down" position.

REFERENCE NUMBERS

Figure 1:
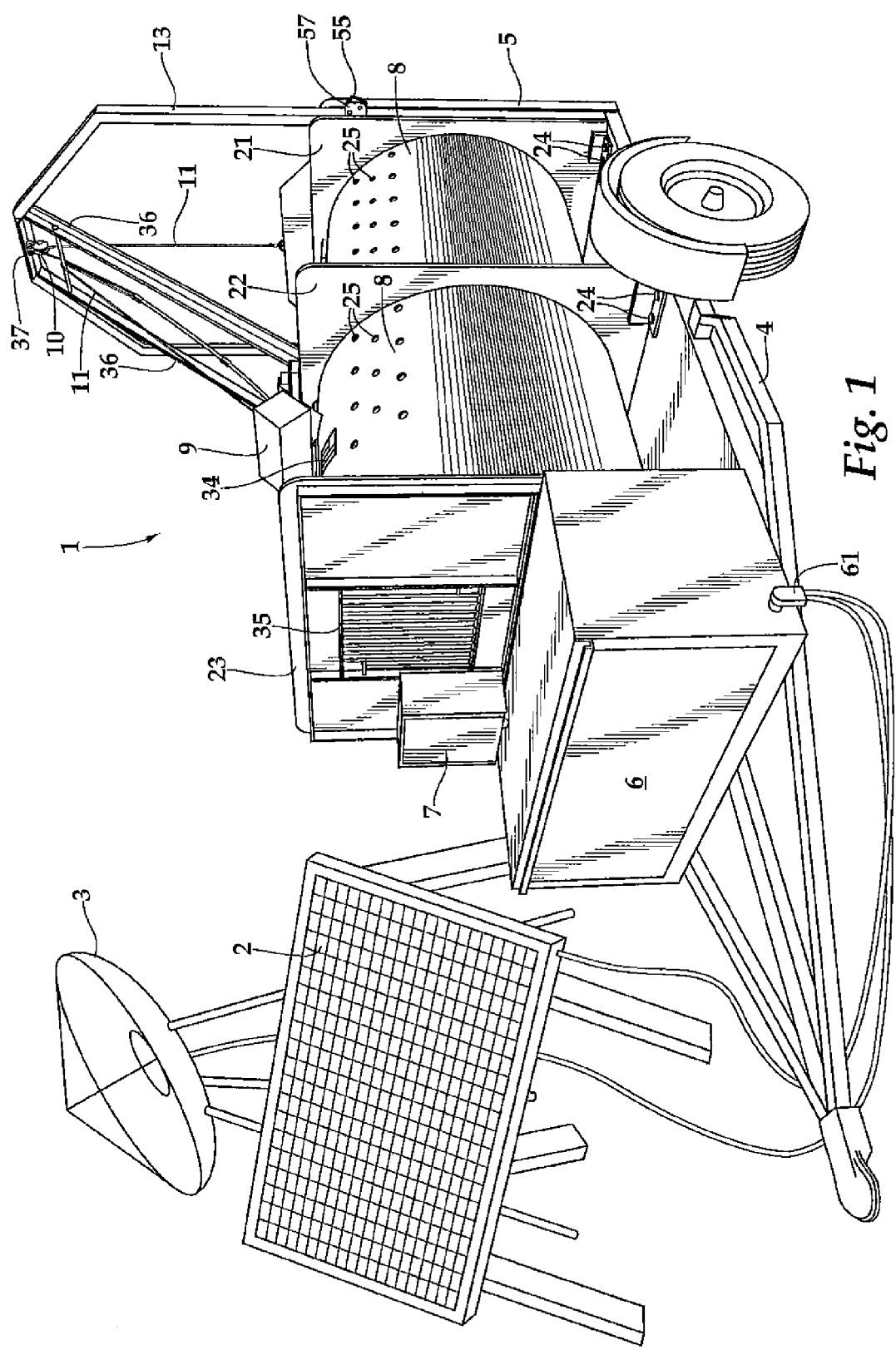
FIG. 1 is a perspective view of the bear trap with the trap door in a closed position and the ramp in a transport position.

1 Bear trap
2 Solar panel
3 Satellite dish
4 Trailer bed
5 Ramp
6 Electronics box
7 Camera/light box
8 Tubular housing
9 Winch housing
10 Pulley
11 Cable
12 Trap door
13 Track (for trap door)
14 Bar 15 Window (in trap door)
15a Aperture (in window on trap door)
16 Aperture (in bottom of trap door)
17 Magnet
18 Protective cover (for magnet)
19 First magnet sensor
20 Second magnet sensor
21 First plate
22 Second plate
23 Third plate
24 Bolt
25 Ventilation hole
26 Water trough
27 Food trough
28 Aperture (in tubular housing for water trough)
29 Aperture (in tubular housing for food trough)
30 Temperature sensor (inside trap)
31 Camera window
32 Light window
33 Bait arm
34 Window (in ceiling of tubular housing)
34a Aperture (in window on ceiling of tubular housing)
35 Window (in third plate)
35a Aperture (in window in third plate)
36 Support member
37 Frame
38 Shuttle piece
39 Main body (of shuttle piece)
40 Spring
41 Aperture (in ceiling of tubular housing for bait arm)
42 Bracket (for bait arm pivot)
43 Pivot point (of bait arm)
44 Bait arm handle
45 Bottom end (of bait arm)
46 Holes (in bait arm for attaching bait)
47 First bearing
48 Second bearing
49 Third bearing
50 Shuttle piece housing
51 Bracket (for securing rod)
52 Rod
53 First lateral extension
54 Second lateral extension
55 Bat wing
56 Pivot point (of bat wing)
57 Bracket (for bat wing)
58 Conduit (for winch cables)
59 Conduit (for first and second magnetic sensors)
60 Conduit (to electronics box)
61 Access port (on electronics box)
62 Camera
63 Infrared light
64 Visible spectrum light
65 Bungee cord
66 Actuator
67 Bracket (for actuator)
68 Actuator piston
69 First safety disconnect
70 Second safety disconnect
71 Third safety disconnect
72 Fourth safety disconnect
73 Fuse panel
74 Wireless remote control unit
75 Solar panel charge controller
76 Battery
77 Internet switch
78 Power-over-Ethernet injector
79 Patch panel
80 Voltage monitor
81 12-volt to 24-volt converter
82 Industrial computer
83 Power supply unit
84 I/O unit
85 Computer unit
86 Terminal block
87 Relay panel
88 Contactor
89 Temperature sensor (in electronics box)
90 Control switch (for selecting local or remote control for the winch)
91 Wireless remote winch control
92 Safety disconnect panel
93 Stabilizer
94 Pin (for bat wing)
95 Local (tethered) winch control switch

DETAILED DESCRIPTION OF INVENTION

FIG. 1 is a perspective view of the bear trap with the trap door in a closed position and the ramp in a transport position. The present invention is a bear trap 1 that is powered by a solar panel 2 in the field and that transmits data via a satellite dish 3 to a computer (not shown) that may be located anywhere in the world. Unlike other "remotely operated" animal traps, the computer need not be within radio frequency range of the trap.

Figures 2, 2A:
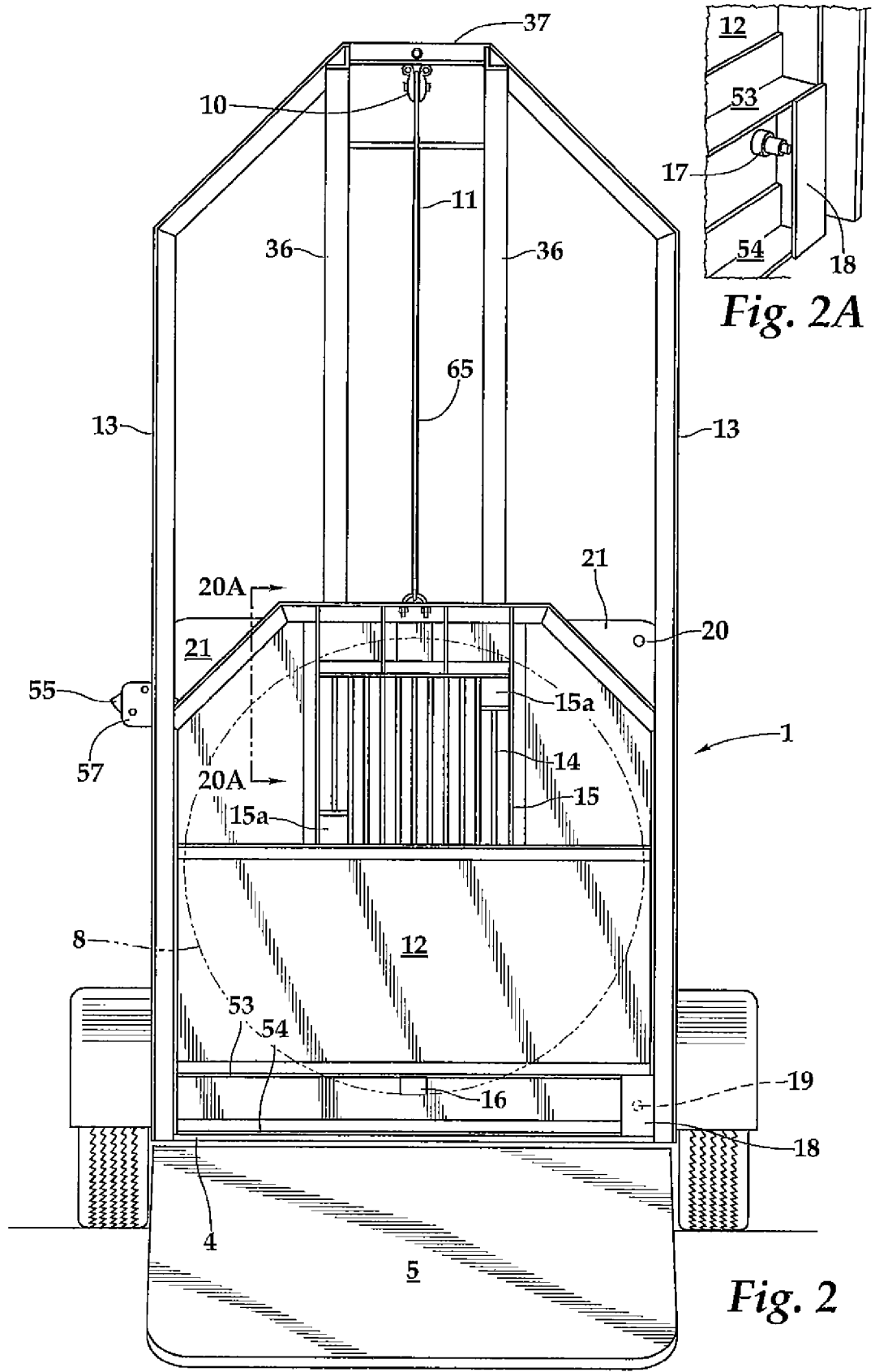
FIG. 2 is a rear view of the bear trap with the trap door in a closed position.
FIG. 2A is a detail perspective view of the door magnet.

In a preferred embodiment, the bear trap 1 is bolted onto a standard hitch trailer bed 4. This allows the bear trap 1 to be transported into the field. At the field, the trailer bed 4 is disconnected from the vehicle, and the ramp 5 is let down. In FIG. 2, the ramp 5 is shown in a transport position.

As shown in FIG. 1, the bear trap 1 comprises an electronics box 6, a camera/light box 7, a tubular housing 8, a winch (not shown) inside of winch housing 9, a pulley 10 and a cable 11. The function of these various parts is explained more fully below in connection with subsequent figures.

FIG. 2 is a rear view of the bear trap with the trap door in a closed position. As shown in this figure, the bear trap 1 comprises a trap door 12 that slides up and down vertically within tracks 13 that are preferably lined with TEFLON™. The winch (not shown) in the winch housing 9 (see FIG. 1) retracts and extends the cable 11, which in turn either lifts the trap door or allows it to drop. The cable 11 is attached on one end to the winch, extends up and over the pulley 10, and is attached on the other end to the top of the trap door 12.

The trap door 12 preferably comprises a window 15 with a plurality of bars 14 through which the trap operator and others may view the bear inside the trap. The window 15 preferably comprises two apertures 15a through which a biologist might, for example, insert a tranquilizer dart gun to tranquilize a bear in the trap. The bars 14 are preferably rounded so as to avoid injuring a trapped bear. For this same reason, the main housing of the trap 8 is preferably tubular. The trap door 12 further comprises an aperture 16 at the bottom of the trap door through which the shuttle piece (see FIG. 5) extends, thereby maintaining the trap door 12 in an "up" (or open) position.

The trap door also comprises a magnet 17 (see FIG. 2A) located beneath a magnet cover 18. The magnet 17 is preferably located on the bottom right or left-hand side of the trap door 12 (in FIG. 2, it is on the bottom right-hand side of the trap door). When the trap door is in a "down" position, the magnet 17 is horizontally aligned with a first magnet sensor 19 (see FIG. 3). When the trap door is in an "up" position, the magnet 17 is horizontally aligned with a second magnet sensor 20 located on the first plate 21 behind the trap door 12. The bear trap 1 preferably comprises a second plate 22 located at roughly the center point of the tubular housing 8 and a third plate 23 located on the front end of the tubular housing 8. The purposes of these plates 21, 22, 23 is to serve as an attachment point so that the bear trap 1 can be bolted to the trailer bed 4 (see FIG. 1, which shows the bolts 24). The first plate 21 also holds the first magnet sensor 19.

Figure 3:
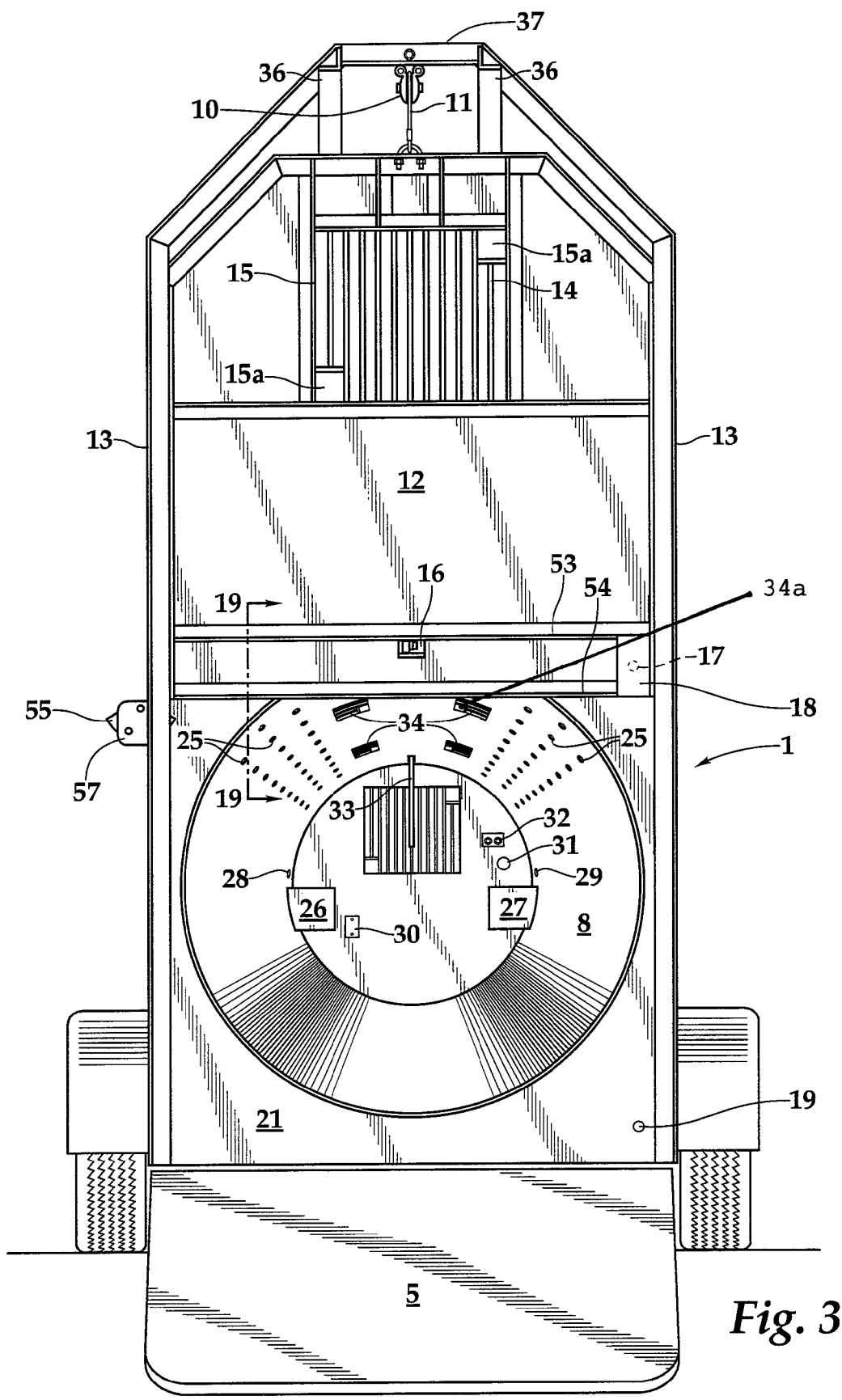
FIG. 3 is a rear view of the bear trap with the trap door in an open position.

FIG. 3 is a rear view of the bear trap with the trap door in an open position. As shown in this figure and FIG. 1, the tubular housing 8 preferably comprises a plurality of ventilation holes 25 that allow the bear to breathe when it is inside the trap. In a preferred embodiment, inside the trap are a water trough 26, a food trough 27 and corresponding apertures 28, 29, respectively, in the tubular housing 8 through which water and food may be placed in the water and food troughs 26, 27. Also located inside the trap are a temperature sensor 30, a camera window 31, and two light windows 32. As shown in FIG. 13, the light windows 32 preferably correspond to an infrared light and a visible spectrum light. In a preferred embodiment, a temperature sensor (not shown) is also located on the outside of the bear trap 1 to monitor the ambient temperature.

The bait arm 33 (shown more clearly in FIG. 6) is also located inside the trap. When the trap is installed in the field, the trap operator would secure bait (such as a deer carcass) to the bait arm 33. In addition to the ventilation holes, the tubular housing 8 preferably comprises one or more windows 34 with bars (similar to the window 15 with bars 14 on the trap door) in the ceiling of the tubular housing 8 through which the bear may be viewed. These windows 34 preferably comprise aperture 34a through which a biologist might insert a tranquilizer dart gun.

Figure 4:
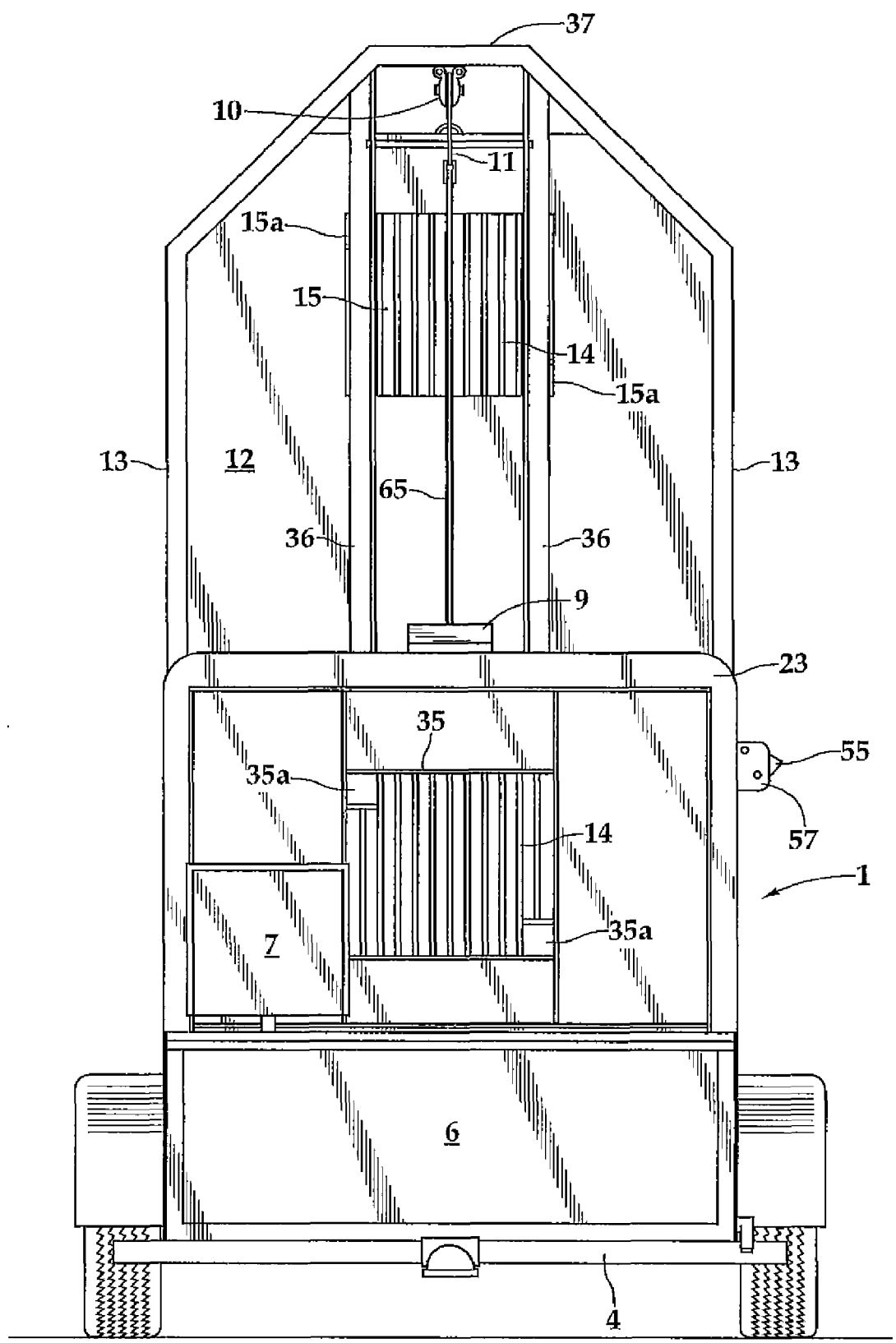
FIG. 4 is a front view of the bear trap with the trap door in an open position.

FIG. 4 is a front view of the bear trap with the trap door in an open position. This figure shows the electronics box 6, the camera/light box 7, and the window 35 in the third plate 23. As with the other windows 15, 34, this window 35 preferably comprises a plurality of bars 14 and at least one aperture 35a for insertion of a tranquilizer dart gun. As shown in this figure and in FIG. 1, two support members 36 extend from the frame 37 on top of the pulley 10 to the middle plate 22. The purpose of these support members 36 is to support the frame 37, which holds the tracks 13 on which the trap door 12 slides.

Figure 7:
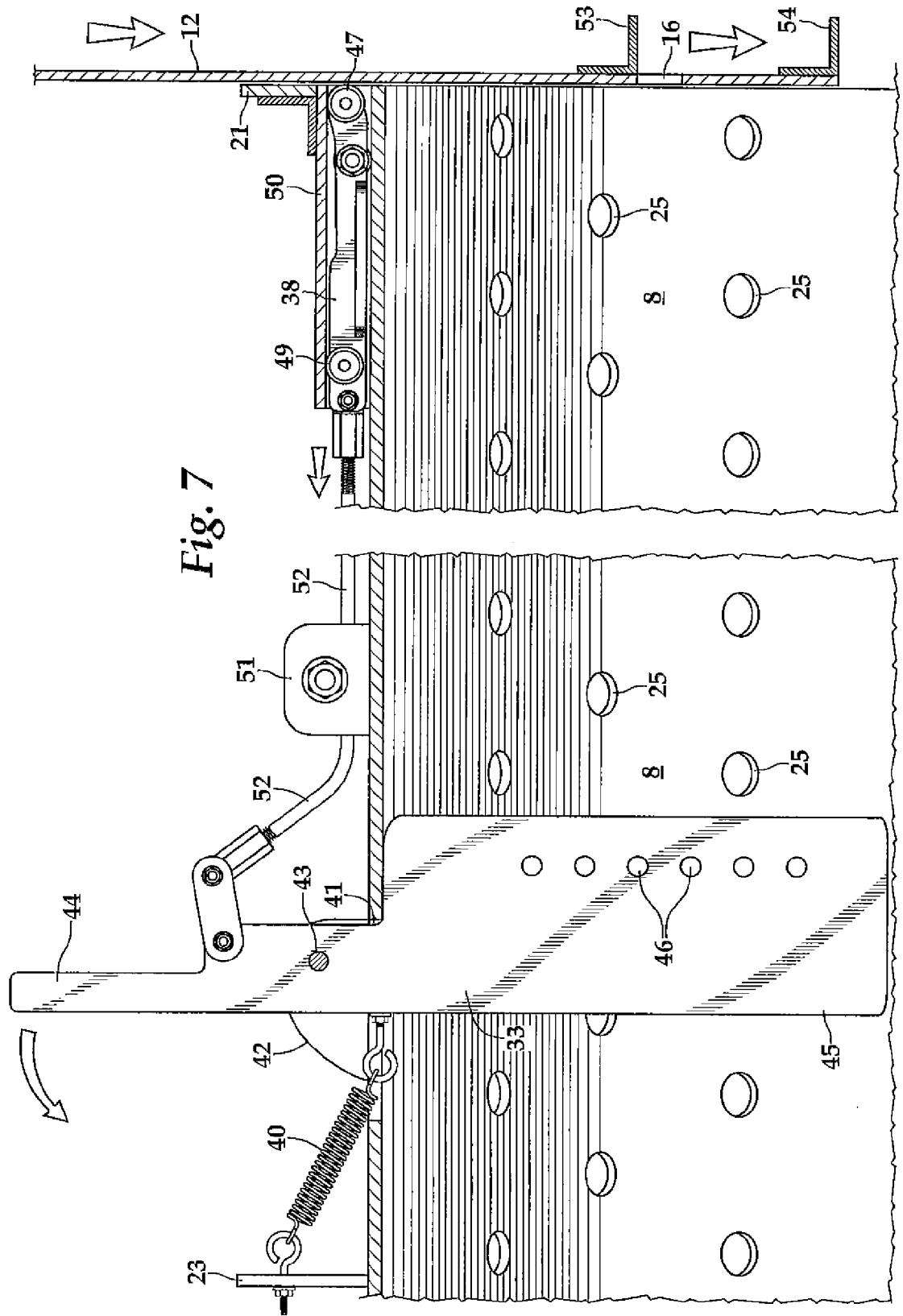
FIG. 7 is a section view of the bait arm and shuttle piece assembly with the bait arm in a rearward position and the trap door in a closed position.

FIG. 5 is a top view of the shuttle piece that holds the trap door in an open position. The shuttle piece 38 preferably comprises a main body 39 and three bearings. Referring to FIGS. 6 and 7, a spring 40 attached to the third plate 23 is also attached to the bait arm 33 just above the point at which the bait arm 33 extends downward through an aperture 41 in the ceiling of the tubular housing 8 directly rearward of the third plate 23. The bait arm 33 is pivotally attached to a bracket 42 at a pivot point 43 such that if a person pulls the bait arm handle 44 forward (toward the third plate 23) or a bear pulls on the bait, thereby pulling the bottom end 45 of the bait arm 33 rearward (toward the trap door 12), the top end of the bait arm will swing forward and the bottom end of the bait arm will swing rearward, thereby increasing tension on the spring 40 and causing the rod 52 that connects the bait arm 33 to the shuttle piece 38 to move horizontally forward (toward the third plate 23). This in turn causes the shuttle piece 38 to move forward and the first bearing 47 to move through the aperture 16 in the trap door 12, thereby causing the trap door 12 to slam downward through the force of gravity—assuming neither the bat wing (see FIGS. 9-11) nor the actuator (see FIGS. 18-20) are also holding the trap door 12 up. The bracket 42 is fixedly attached to the roof of the tubular housing 8.

Referring again to FIG. 6, when the trap door 12 is in an "up" position and no pressure is placed on the bait arm handle 44 or the bottom end 45 of the bait arm 33 (other than the fact that bait is tied to the bait arm 33 using the bait arm holes 46), the tension in the spring causes the spring to retract 40, thereby causing the bait arm handle 44 and bottom end 45 of the bait arm 33 to move back to the position shown in FIG. 6 and the shuttle piece 38 to move forward such that the first bearing 47 extends through the aperture 16 in the trap door 12 and prevents the trap door 12 from moving downward. The purpose of the second and third bearings 48, 49 is to prevent the shuttle piece from abutting up against the shuttle piece housing 50 and/or the roof of the tubular housing 8. Optional brackets 51 (only one is shown in FIGS. 6 and 7) may be used to secure the rod 52 in place (that is, prevent it from moving laterally or vertically) while still allowing it to move horizontally (forward and rearward, as described above).

As shown in FIGS. 6 and 7, the trap door 12 preferably comprises two lateral extensions. The first lateral extension 53 rests on top of the first bearing 47 when the trap door 12 is in an "up" position. The second lateral extension 54 rests on top of the bat wing 55 (see FIG. 10) or actuator 66 (see FIG. 20) when the trap door 12 is in a "down" position.

FIG. 8 is a left side view of the bear trap with the trap door in an open and armed position. (The term "armed position" means that the cable has been let out, as described in connection with FIGS. 14-16.) This figure shows the conduit 58 for the winch cables and the conduit 59 for the first and second magnetic sensors 19, 20. As shown in this figure, conduits 58 and 59 join conduit 60, which runs underneath the trailer bed 4 and into the electronics box 6. The trailer bed 4 is preferably stabilized with stabilizers 93 situated underneath the trailer bed 4 on either side of the rear of the trailer bed and also in front of the electronics box 6, as shown in FIG. 8. The stabilizers 93 ensure that the trap 1 remains stable with a bear inside the trap.

FIG. 9 is a detail view of the bat wing in a locked position. The bat wing 55 is an optional feature that is situated to the outside of the track 13, roughly halfway up the track (measuring from the bottom of the track to the point at which the track angles inward toward the frame 37; see FIG. 2) such that when the trap door 12 is in an "up" position, the second lateral extension 54 rests on top of the bat wing 55 (see FIG. 10). The bat wing 55 rotates on a pivot point 56 located on a bat wing bracket 57 that is fixedly attached to the frame of the track 13 and may be fixed in a retracted position with a pin 94 so that it is out of the way (see FIG. 9). The bat wing 55 also serves the purpose of preventing the trap door 12 from being lifted by a bear inside the trap, as shown in FIG. 11.

FIG. 12 is a right side view of the bear trap with the trap door in an open and armed position. This figure shows the access port 61 through which cables may exit the electronics box 6.

FIG. 13 is a perspective view of the components inside the camera/light box. As shown in this figure, the camera/light box 7 houses a camera 62 (preferably an Internet Protocol (IP)-enabled or "network" camera), as well as infrared 63 and visible spectrum 64 lights. The camera 62 and lights 63, 64 may be activated remotely via a remote computer (not shown). The infrared light 63 may be used to monitor (view) the bear at night via the camera, and the visible spectrum light 64 may be used to see the color of the bear, to provide more light for use of the tranquilizer dart gun, and/or to show the bear that the door is open if the operator would like the bear to exit the trap.

FIGS. 14-16 illustrate how the mechanism by which the trap door is armed. In FIG. 14, the trap door 12 has just been raised but is unarmed, and the cable 11 is taught. In FIG. 15, the trap door 12 is up, and the cable 11 has been let out so that the trap door will be able to fall if and when a bear enters the trap and pulls on the bottom end 45 of the bait arm 33; this is the "armed" position. FIG. 16 shows the cable after the door has dropped. In a preferred embodiment, a bungee cord 65 is attached to the winch cable 11 to pull the cable off of the winch when the trap door is armed so that sufficient cable is out for the trap door to drop to the bottom of the trap when activated.

FIG. 17 is a detail perspective view of the magnet and magnetic sensor assembly. As noted above, the magnet 17 is located on the bottom of the trap door 12 (see FIGS. 2 and 2A), and the magnetic sensors 19, 20 are located on the first plate 21 behind the trap door 12.

FIG. 18 is a perspective view of the rear top area of the bear trap with an optional actuator. If used, the actuator 66 would replace the bat wing 55 as a mechanism for maintaining the door in an "up" or "down" position. As shown in FIG. 18, the actuator 66 is preferably situated on top of a bracket 67 that is affixed to the outside of the tubular housing 8 such that the actuator piston 68 extends through an aperture (not shown) in the first plate 21 and, when the trap door is in a "down" position, in the trap door 12 itself. Although not shown, a conduit from the actuator 66 to the electronics box 6 would house the power cords for the actuator. FIG. 19 shows the actuator piston 68 in a retracted position, in which only the bearing 47 is holding the trap door 12 up. (The section line on FIG. 3 indicates where the section is taken for FIGS. 19, 20 and 20A.) FIG. 20 shows the actuator piston 68 in an extended position, in which the actuator is also holding the trap door 12 up. The actuator could also be used to prevent bears from lifting the door once a bear is in the trap, as shown in FIG. 20A, in which case the actuator piston 68 would extend through both the first plate 21 and the trap door 12.

Figure 21:
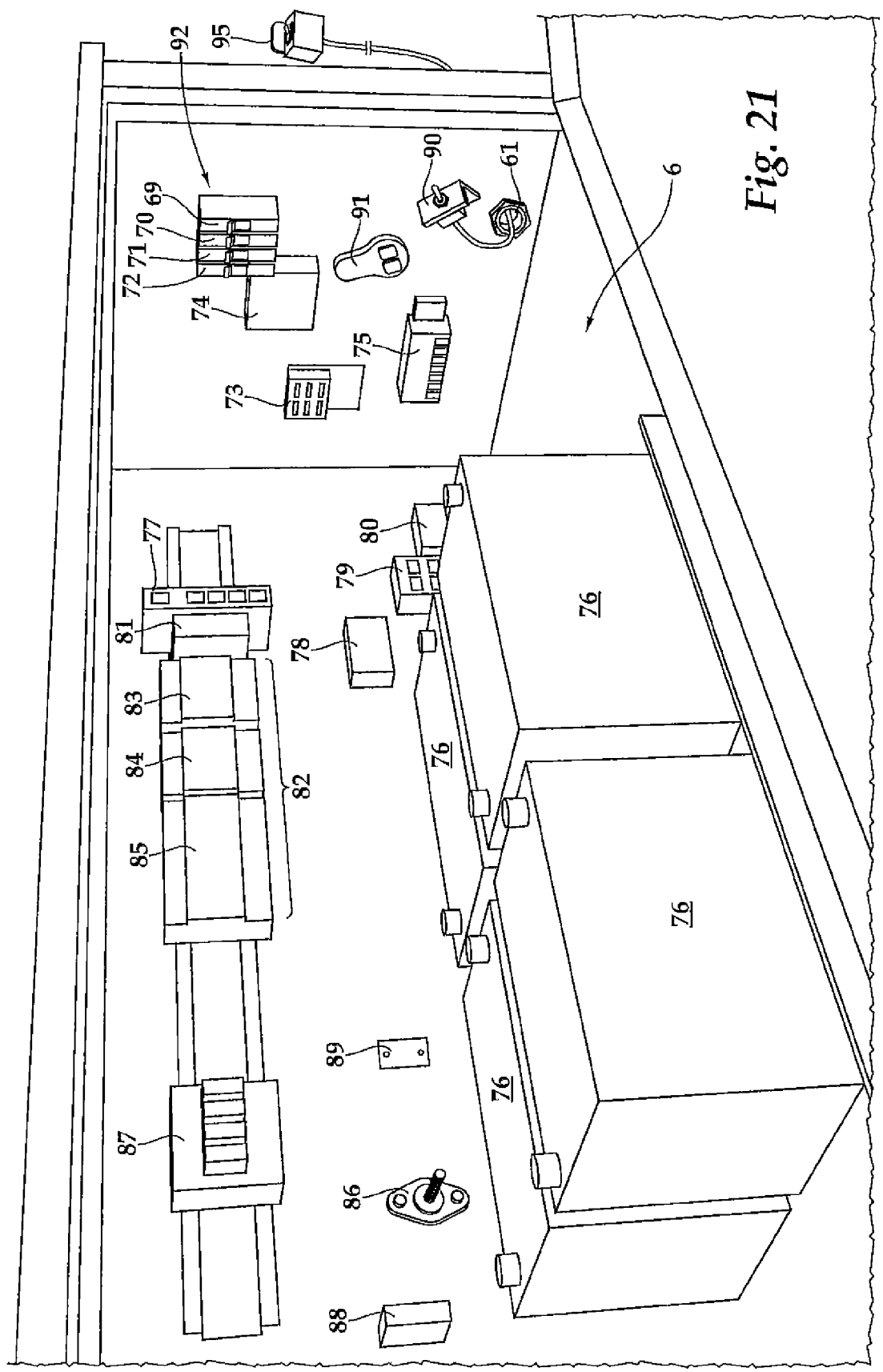
FIG. 21 is a perspective view of the components contained inside the electronics box.

FIG. 21 is a perspective view of the components contained inside the electronics box. The various cables have been omitted from this figure for clarity purposes. As shown in this figure, the electronics box 6 contains a control switch 90 for selecting local or remote control for the winch. This switch allows the winch to be controlled via the Internet, and in another position, allows the winch to be controlled locally, either with a tethered winch control switch 95 or a wireless remote winch control 91. The Internet cable (not shown), solar panel power cables, and the cable for the tethered winch control all exit the electronics box via the access port 61. The outside of the access port 61 is preferably sealed with a waterproof cover, as shown in FIGS. 1 and 12.

The electronics box 6 also contains a safety disconnect panel 92 with four safety disconnects. The first disconnect 69 is for the winch; when this switch is off, no power goes to the winch. The second disconnect 70 is for all of the equipment on the bear trap; when this switch is off, no power goes to any of the components in the electronics box 6. The remaining two safety disconnects 71, 72 are for the two solar panels. (Although only one solar panel is shown in FIG. 1, the invention would typically use two solar panels.)

The electronics box 6 also contains a fuse panel 73, which includes fuses (circuit breakers) for all of the electronics within the electronics box 6, including fuses for the winch contactor, the winch and light relays, the voltage monitor, the lights inside the camera/light box, the 24-volt converter (used to power the industrial computer and the camera), and the network switch (used to combine data from the industrial computer and the camera). The wireless remote control unit 74 for the winch receives signals from the wireless remote winch control 91. The solar panel charge controller 75 receives power from the solar panels and uses that power to charge the batteries 76.

The five-port Internet switch 77 combines data output from the industrial computer with data output from the camera 62. The Internet switch 77 has the capability of connecting with either a fiber optic network or a wired cable network. A fiber optic network would typically be used if the satellite dish is more than 300 feet from the bear trap. A wired network cable would typically be used if the satellite dish is within 300 feet of the bear trap or to connect to an Internet interface other than satellite, if such a network port is available. The power-over-Ethernet injector 78 is used to provide power for a radio connect to the Internet (for example, when a wireless Internet connection is being used in lieu of the satellite dish). The patch panel 79 is used to connect either the satellite or the radio to the Internet switch. The voltage monitor 80 reports battery voltage to the industrial computer 82 and is used to monitor the power level in the batteries 76.

A 12-volt to 24-volt converter 81 takes the 12-volt power from the batteries and converts it to 24-volt power to power the industrial computer. The industrial computer 82 controls all of the electronics inside the electronics box 6, as well as the connection to the Internet. (Although an industrial computer is used in the preferred embodiment, other types of computers may serve the same function.) The industrial computer 82 comprises a power supply unit 83, an I/O unit 84 and a computer unit 85. The I/O unit 84 includes inputs for the temperature sensors (located inside the trap, outside the trap and inside the electronics box), the first and second magnet sensors, the battery voltage, and the position of the winch control switch.

The lights can be controlled by a user via the Internet, by the industrial computer and/or by the camera. For example, the industrial computer can be programmed so that the lights can be turned on or off by the user via the user interface (see FIGS. 25-27), so that the lights turn on and off at certain times, or so that the lights turn on or off based on light readings within the camera. In a preferred embodiment, the industrial computer is programmed to allow user input to override whatever setting the camera is requesting (the system may also be reset to allow the camera to control the lights once again). The computer unit 85 is connected to the Internet switch 77 and then to the Internet. Data from the computer unit 85 and from the camera 62 may be viewed remotely from anywhere in the world via a laptop or other device with Internet access.

The terminal block is used to make connections to the negative side of the batteries 76. A relay panel 87 includes relays for the lights inside the camera/light box and relays for the contactor 88. The contactor 88 is a high-power relay that controls the current required to operate the winch. A temperature sensor 89 inside the electronics box 6 allows the operator to monitor the temperature inside the electronics box 6 to make sure it does not get too hot.

Figure 22:
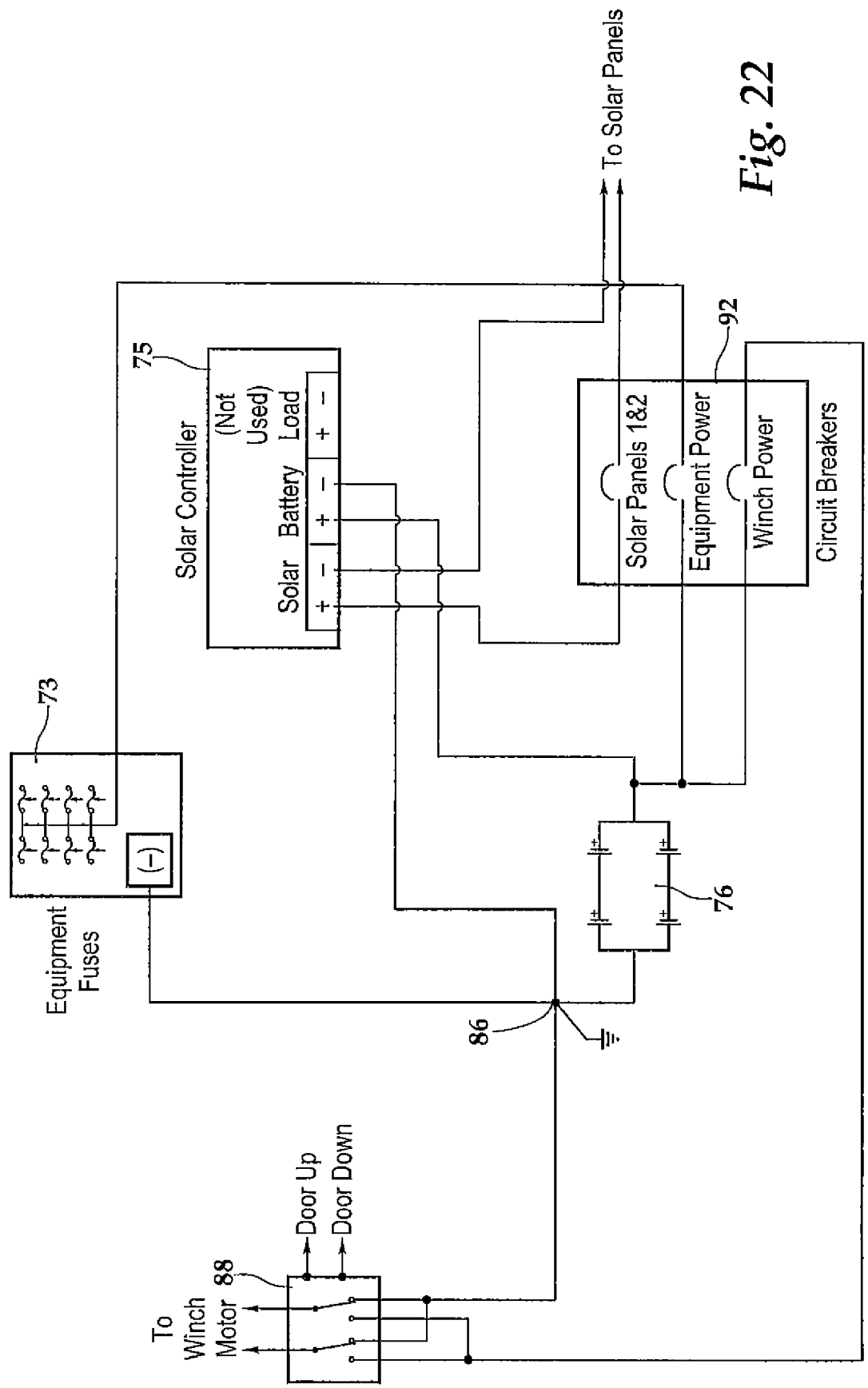
FIG. 22 is a schematic diagram of the power distribution aspects of the present invention.
Figure 23:
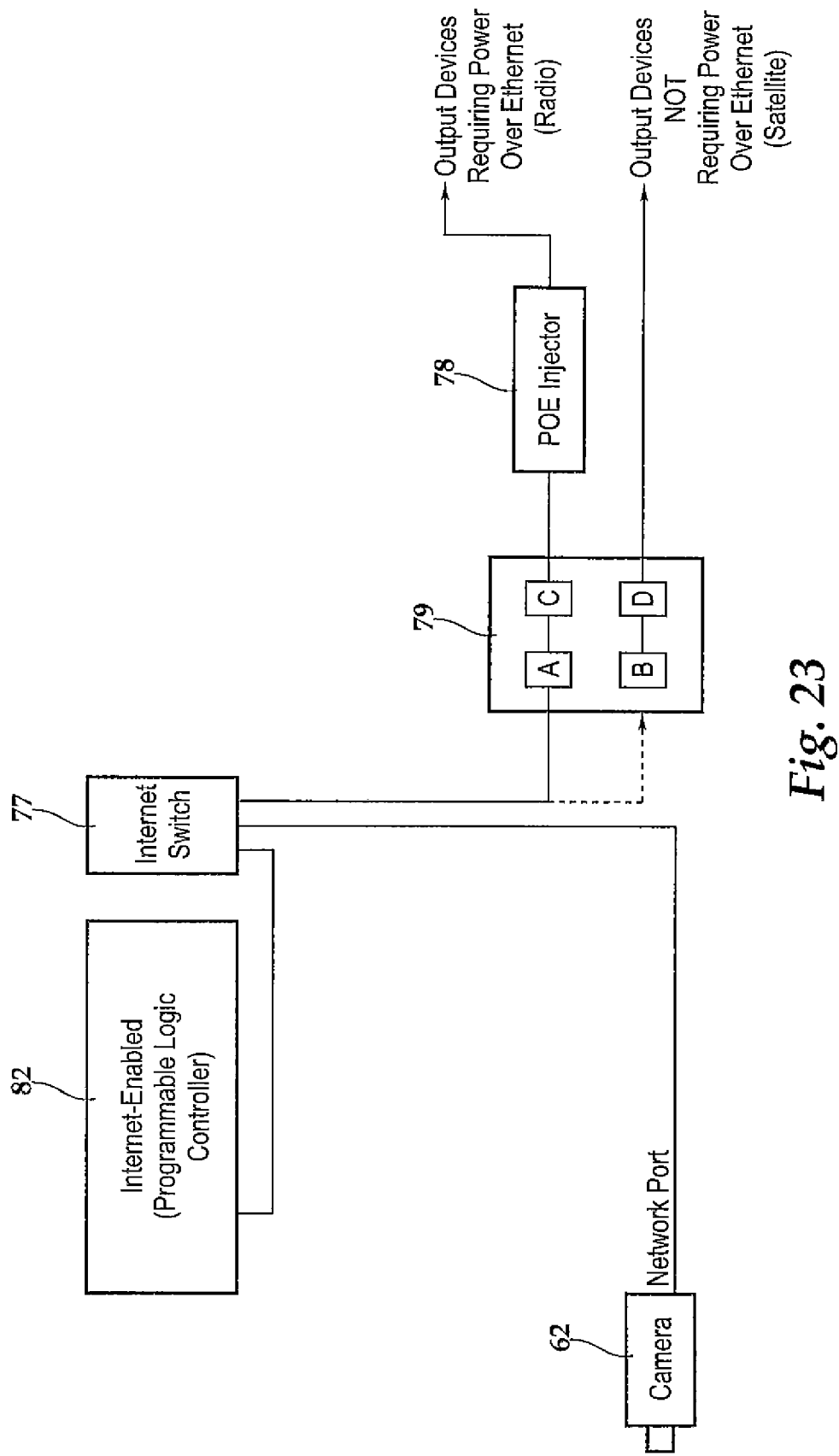
FIG. 23 is a schematic diagram of the equipment, sensors and controls of the present invention.
Figure 24:
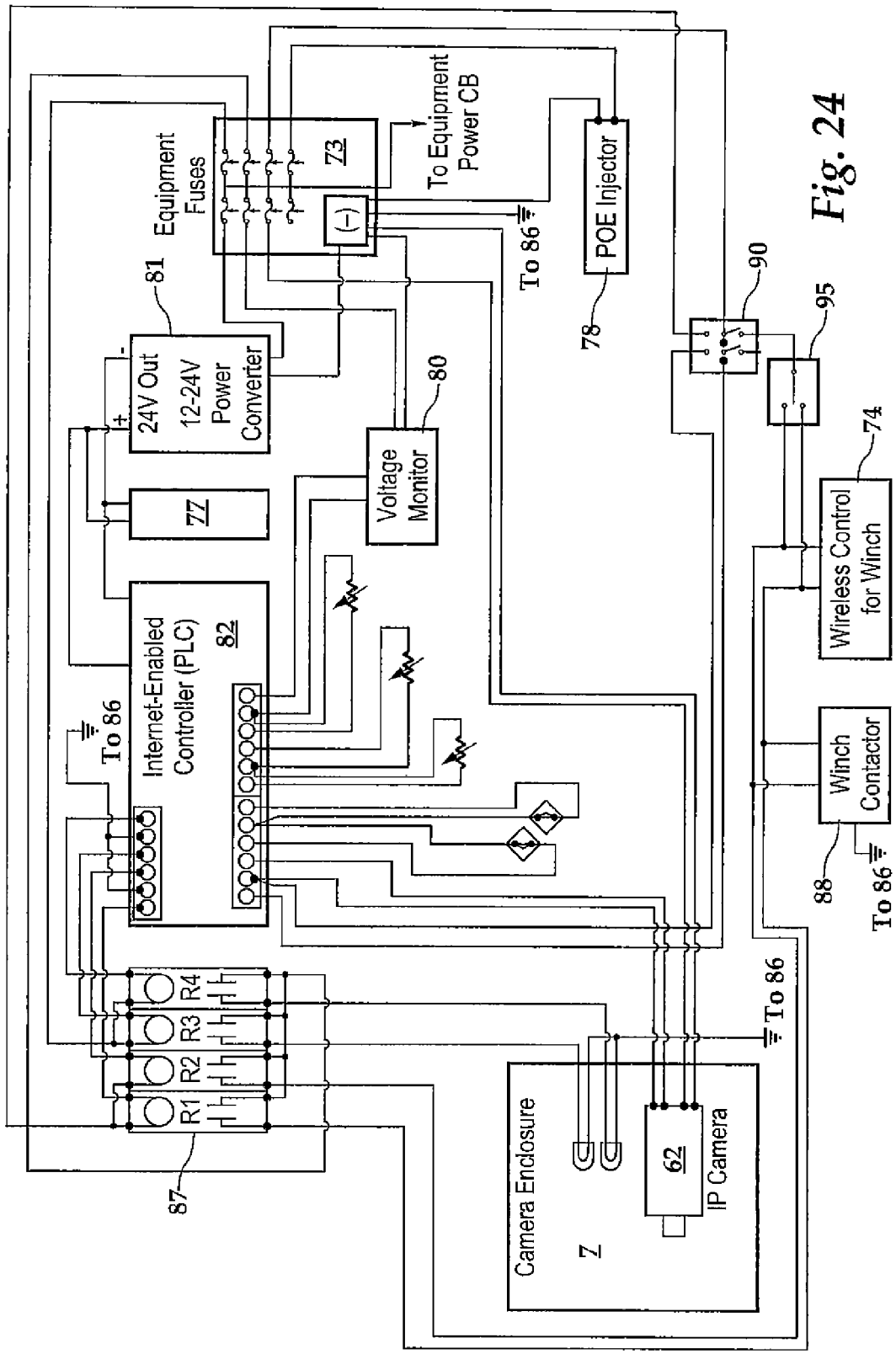
FIG. 24 is schematic diagram of the network details of the present invention.

FIG. 22-24 are, respectively, schematic diagrams of the power distribution aspects of the present invention, the equipment, sensors and controls of the present invention, and the network details of the present invention. The components in these figures are labeled in accordance with FIG. 21.

Figure 25:
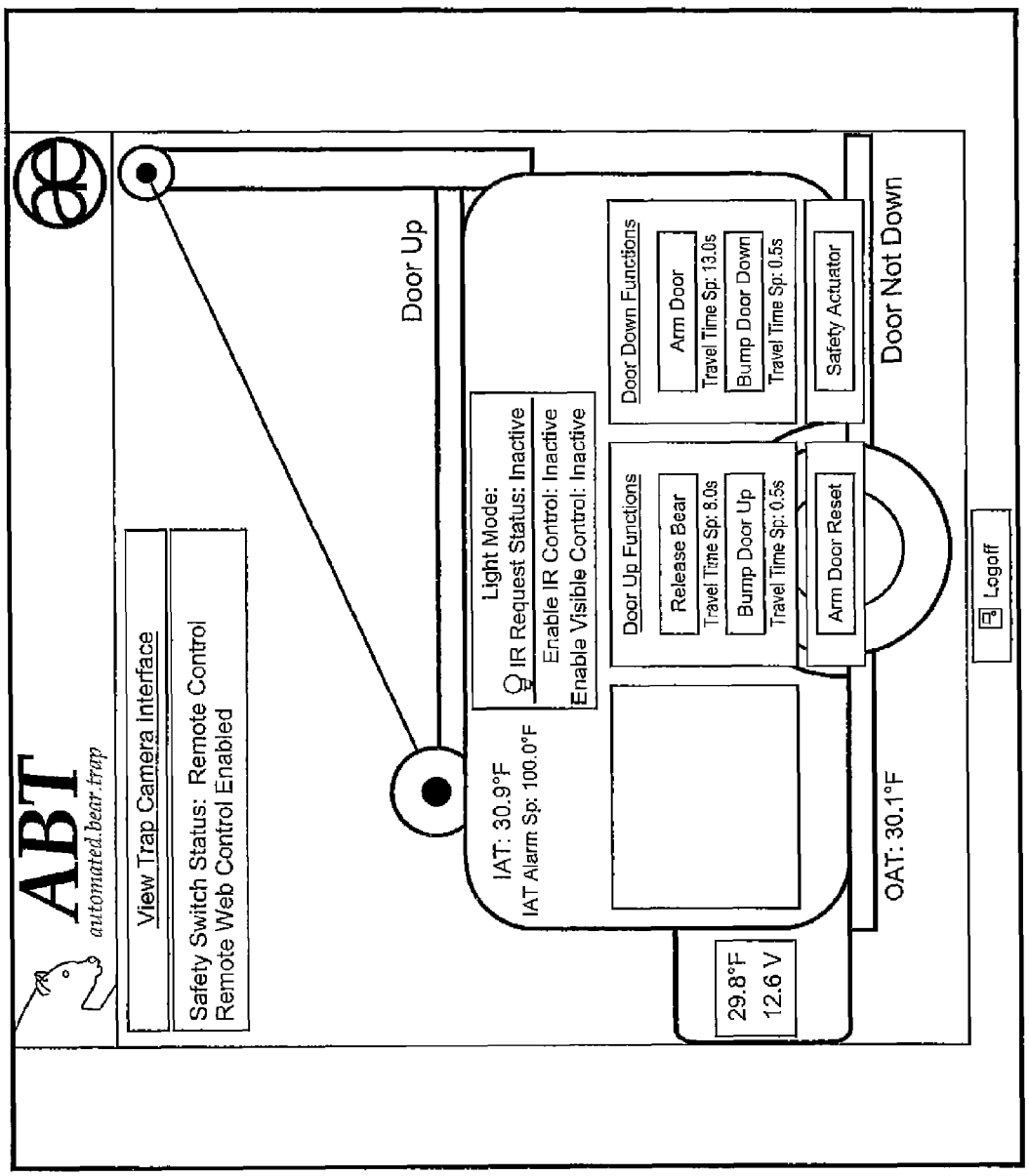
FIG. 25 is a screenshot of the user interface of the present invention when the trap door is up and unarmed.
Figure 26:
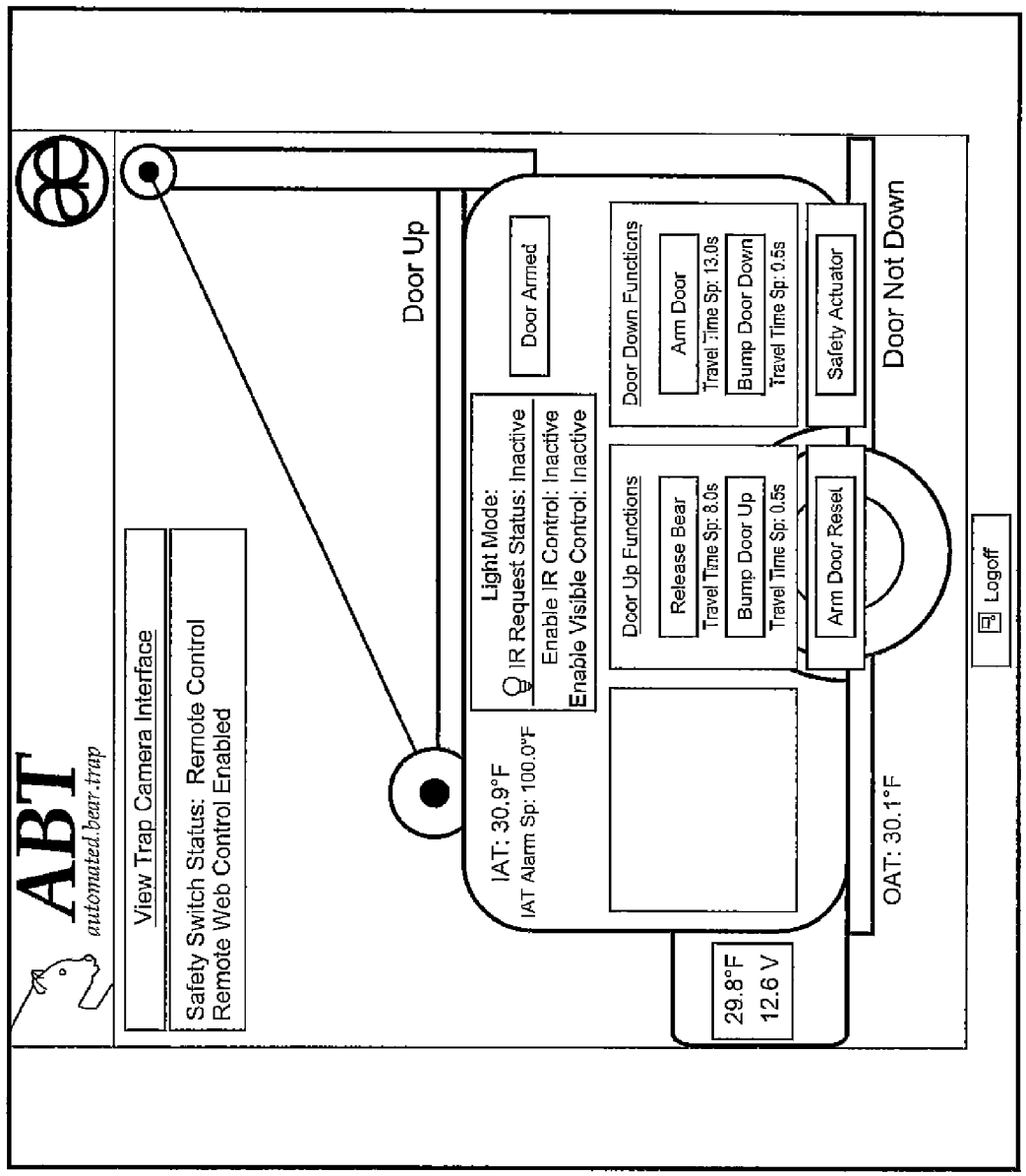
FIG. 26 is a screenshot of the user interface of the present invention when the trap door is up and armed.
Figure 27:
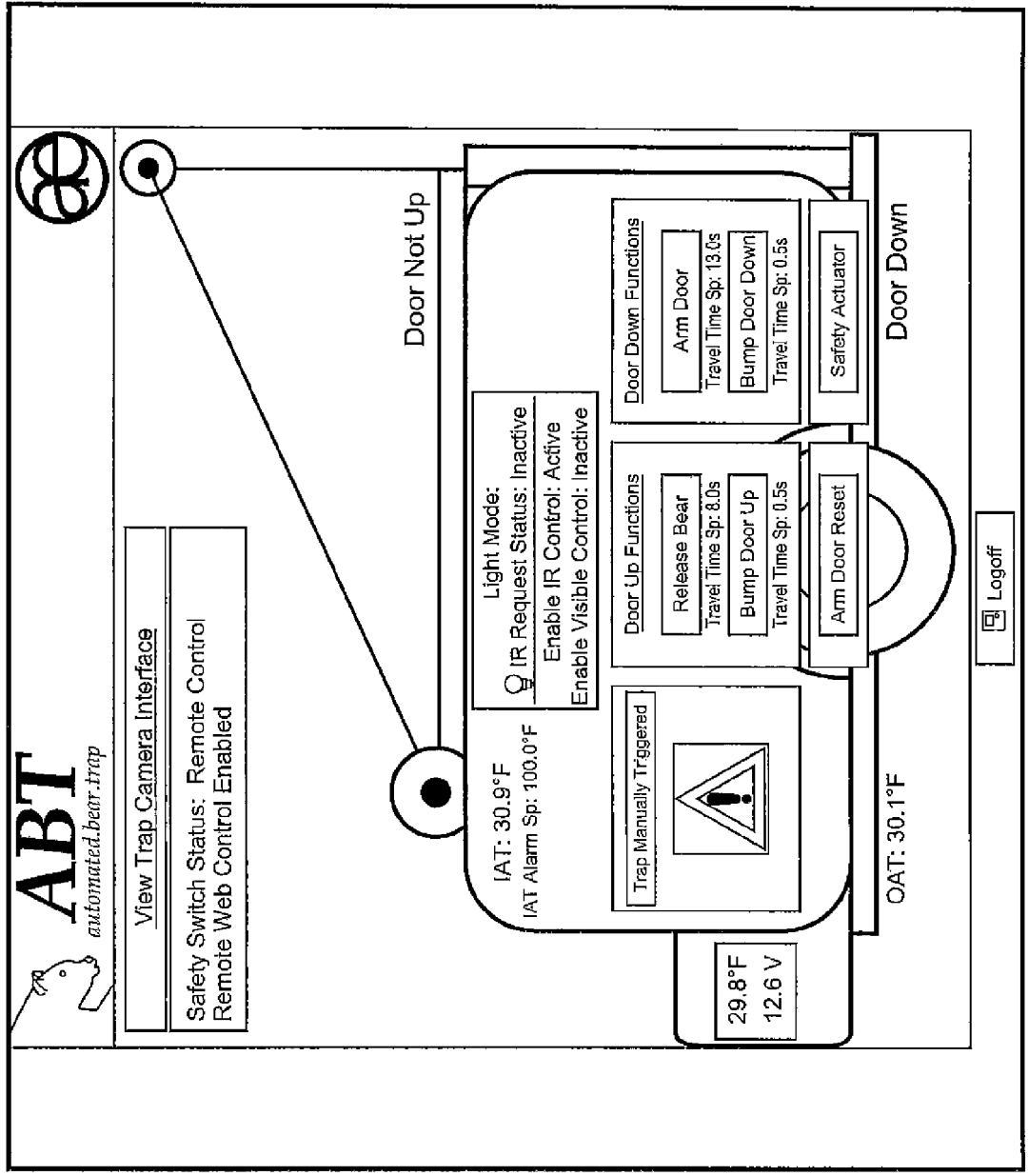
FIG. 27 is a screenshot of the user interface of the present invention when the trap door is down and a bear is in the trap.

FIGS. 25-27 are screenshots of the user interface of the present invention when the trap door is up and unarmed, when the trap door is up and armed, and when the trap door is down and a bear is in the trap, respectively. As shown in these drawings, the trap door can be raised or lowered, the trap door can be armed, and the lights (infrared and visible spectrum) can be turned on or off from the user interface of the remote computer. The "view trap camera interface" link takes users to a separate page (not shown) on which the camera view of the inside of the bear is displayed. The "safety switch status" indicates whether the winch control switch is on "local" or "remote." Language directly underneath the safety switch status ("Remote Web Control Enabled") also indicates whether the winch control switch is on the local or remote setting.

The temperature inside the trap (Inside Air Temperature or IAT) is indicated in the upper left-hand corner of the trap schematic. If the TAT temperature exceeds the alarm set point (IAT Alarm Sp.), then a warning will be provided on the screen to the operator so that he can determine whether to open the trap and let the bear out. The temperature inside the electronics box and the battery voltage are indicated on the schematic roughly where the electronics box would be (bottom left). The outside air temperature (OAT) is indicated underneath the bottom left-hand side of the trap schematic. (In one embodiment, the outside air temperature sensor is located underneath the trailer bed at roughly the location of the "OAT" in FIG. 25.)

The light mode settings relate to the infrared and visible spectrum lights. In a preferred embodiment, the camera may be set (not via this screenshot but via a direct camera setting) so that it can automatically turn on the infrared light based on the level of visible spectrum light naturally available inside the trap. If the camera is set to do this, and if the camera has turned on the infrared light, then it would say "Active" after "IR Request Status." As currently shown in FIG. 25, the camera has not turned on the infrared light because it says "Inactive." The "Enable IR Control" and "Enable Visible Control" buttons indicate whether the operator has elected to turn on either the infrared or the visible spectrum lights remotely. In this case, because it says "Inactive" after both "Enable IR Control" and "Enable Visible Control," the operator has not elected to turn on either of these lights.

The "Door Up Functions" allow the operator to release the bear by raising the door completely (travel time for the door is pre-set to eight seconds) or to bump the door up (travel time for the door is pre-set to 0.5 seconds). The "Arm Door Reset" button only appears on the administrator's page; in a preferred embodiment, the operator may only click on "Arm Door" (under "Door Down Functions") once unless the administrator clicks the "Arm Door Reset" button. (The reason for this is to prevent too much cable from being accidentally un-spooled.) The "Door Up Functions" allow the operator to arm the door by letting out the winch cable (travel time for the winch cable is pre-set to 13 seconds) or to bump the door down (travel time for the door is pre-set to 0.5 seconds). Note that the door may not be armed until and unless the door has been raised (and the second magnetic sensor 20 is active). The "safety actuator" button activates the actuator shown in FIGS. 18-20.

The difference between FIGS. 25 and 26 is that the door is armed in FIG. 26 but not in FIG. 25. This is shown by the "Door Armed" message that appears in FIG. 26 but not in FIG. 25. In FIG. 27, a bear has entered the trap and triggered the trap door; therefore, a "Trap Manually Triggered" warning message appears in FIG. 27 that is not present in FIGS. 25 and 26. In addition, the "Door Armed" message that was on FIG. 26 is gone, and it says "Door Down" underneath the trap schematic on the bottom right-hand side (FIGS. 25 and 26 both say "Door Not Down").

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A bear trap comprising:
   (a) a trap door;
   (b) a housing that is large enough to enclose a bear and bear bait;
   (c) a bait arm;
   (d) a computer;
   (e) a temperature sensor located inside the housing; and
   wherein the bait is attached to the bait arm;
   wherein the trap door is situated on the housing;
   wherein when a bear enters the trap and pulls on the bait on the bait arm, the trap door descends;
      wherein the computer activates a switch that is operatively connected to the trap door and allows a user to lift the trap door remotely from anywhere in the world via a device with Internet access;
      wherein the computer and the temperature sensor allow a user to monitor the temperature inside the housing from anywhere in the world via the device with Internet access; and
      wherein the computer and the camera allow a user to view a bear inside the housing from anywhere in the world via the device with Internet access.

2. The bear trap of claim 1, wherein the computer activates the winch to allow a user to arm the trap door by lifting the trap door and letting out a cable that connects the trap door to the winch remotely from anywhere in the world via the device with Internet access.

3. A bear trap comprising:
   (a) a trap door;
   (b) a housing that is large enough to enclose a bear and bear bait;
   (c) a bait arm;
   (d) a first computer;
   (e) a first temperature sensor located inside the housing; and
   (f) a camera;
   wherein the bait is attached to the bait arm;
   wherein the trap door is situated on one end of the housing;
   wherein when a bear enters the trap and pulls on the bait on the bait arm, the trap door descends;
      wherein the first computer activates a winch that is operatively connected to the trap door and allows a user to lift the trap door remotely from anywhere in the world via a second computer with Internet access;
      wherein the first computer and the first temperature sensor allow a user to monitor temperature inside the housing from anywhere in the world via a the second computer with Internet access; and
      wherein the first computer and the camera allow a user to view a bear inside the housing from anywhere in the world via a second computer with Internet access.

4. The bear trap of claim 3, wherein a cable connects the trap door to the winch, and wherein the first computer activates the winch to allow a user to arm the trap door by lifting the trap door and letting out the cable remotely from anywhere in the world via the second computer with Internet access.

5. The bear trap of claim 3, wherein the first computer connects to the Internet via satellite.

6. The bear trap of claim 3, wherein the bear trap is powered by solar panels.

7. The bear trap of claim 3, further comprising a first magnetic sensor, a second magnetic sensor and a magnet, wherein a first plate is situated directly behind the trap door when the trap door is in a closed position, wherein the first plate has a top end and a bottom end, wherein the first magnetic sensor is located on the bottom end of the first plate, wherein the second magnetic sensor is located on the top end of the first plate, wherein the trap door has a bottom end, and wherein the magnet is located on the bottom end of the trap door.

8. The bear trap of claim 3, wherein the first computer is located inside of an electronics box, further comprising a second temperature sensor that is located inside the electronics box, wherein the first computer and the second temperature sensor allow a user to monitor temperature inside the electronics box remotely from anywhere in the world via the second computer with Internet access.

9. The bear trap of claim 3, further comprising a third temperature sensor that measures ambient temperature in the vicinity of the bear trap, wherein the first computer and the third temperature sensor allow a user to monitor ambient temperature in the vicinity of the bear trap remotely from anywhere in the world via the second computer with Internet access.

10. The bear trap of claim 3, further comprising a visible spectrum light and an infrared light, wherein the first computer allows a user to turn the visible spectrum light and the infrared light on and off remotely from anywhere in the world via the second computer with Internet access.

11. The bear trap of claim 3, further comprising a visible spectrum light and an infrared light, wherein the lights are turned on and off automatically based on pre-programmed settings.

12. The bear trap of claim 3, further comprising at least one food trough and at least one water trough inside the housing.

13. The bear trap of claim 3, wherein the bait arm has a bottom end, further comprising a shuttle piece that is connected to the bait arm and that causes the trap door to be maintained in an open position until and unless a bear pulls the bottom end of the bait arm rearward toward the trap door.

14. The bear trap of claim 3, wherein the trap door slides up and down on two vertical tracks, further comprising a bat wing that is attached to one of the vertical tracks and that maintains the trap door in an open or closed position.

15. The bear trap of claim 3, further comprising an actuator that maintains the trap door in an open or closed position when the actuator is extended.

16. The bear trap of claim 3, wherein a cable connects the trap door to the winch, further comprising a winch control switch that allows the winch to be operated either locally or remotely via the Internet.

17. The bear trap of claim 16, wherein if the winch is operated locally, it is operated via a tethered winch control switch.

18. The bear trap of claim 16, wherein if the winch is operated locally, it is operated via a wireless remote winch control.

19. The bear trap of claim 3, wherein the housing comprises ventilation holes.

* * * * *